(12) United States Patent
Perez et al.

(10) Patent No.: US 12,311,606 B2
(45) Date of Patent: *May 27, 2025

(54) ADDITIVE MANUFACTURING DISTRIBUTED INVENTORY MANAGEMENT

(71) Applicant: Baker Hughes Oilfield Operations LLC, Houston, TX (US)

(72) Inventors: Juan Carlos Flores Perez, The Woodlands, TX (US); Mikhail Gladkikh, Conroe, TX (US); Muhammad Faisal Iqbal, Richmond, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 444 days.

This patent is subject to a terminal disclaimer.

(21) Appl. No.: 17/454,387

(22) Filed: Nov. 10, 2021

(65) Prior Publication Data
US 2022/0365511 A1 Nov. 17, 2022

Related U.S. Application Data

(60) Provisional application No. 63/188,955, filed on May 14, 2021.

(51) Int. Cl.
*B29C 64/343* (2017.01)
*B29C 64/386* (2017.01)
(Continued)

(52) U.S. Cl.
CPC .......... *B29C 64/393* (2017.08); *B29C 64/386* (2017.08); *B33Y 50/00* (2014.12);
(Continued)

(58) Field of Classification Search
CPC ............. G06Q 10/087; G06Q 10/0633; G06Q 10/06395; G06Q 20/38215; G06Q 20/389;
(Continued)

(56) References Cited

U.S. PATENT DOCUMENTS 5,517,603 A * 5/1996 Kelley .................... G06T 15/87
345/545
5,959,995 A * 9/1999 Wicki ..................... H04L 45/00
370/351

(Continued)

FOREIGN PATENT DOCUMENTS

AU 2019239672 A1 11/2020
CN 112435038 A 3/2021
(Continued)

OTHER PUBLICATIONS

International Search Report for International Application No. PCT/US2022/072293 dated Aug. 26, 2022, 3 pages.
(Continued)

*Primary Examiner* — Steven S Kim
(74) *Attorney, Agent, or Firm* — TraskBritt

(57) ABSTRACT

Methods may involve sending identification of a product to an additive manufacturer. Confirmation from the additive manufacturer of availability may be received. Approval of a respective additive manufacturer may be confirmed. Discrete packets of operational parameters to enable an additive manufacturing device to manufacture respective portions of the product may be generated. Respective packets of operational parameters may be encrypted and sent to a network-connected additive manufacturing device. The respective packets may be sent only after confirmation that a previous packet is complete and has been deleted. A time from completion of the previous packet may be sufficient to ensure that manufacturing of another portion of the product may begin without interruption in an additive manufacturing process. During at least some stages, a blockchain may be updated to associate data representative of workflows for the product with an encrypted, secure identifier utilizing a secure, distributed transaction ledger.

20 Claims, 7 Drawing Sheets

(51) Int. Cl.

| | | |
|---|---|---|
| B29C 64/393 | (2017.01) | |
| B33Y 50/00 | (2015.01) | |
| B33Y 50/02 | (2015.01) | |
| G01N 23/046 | (2018.01) | |
| G05B 19/4099 | (2006.01) | |
| G06F 16/27 | (2019.01) | |
| G06F 16/28 | (2019.01) | |
| G06Q 10/0633 | (2023.01) | |
| G06Q 10/0639 | (2023.01) | |
| G06Q 10/087 | (2023.01) | |
| G06Q 20/38 | (2012.01) | |
| G06Q 20/40 | (2012.01) | |
| G06Q 30/018 | (2023.01) | |
| G06Q 30/0601 | (2023.01) | |
| G06Q 50/04 | (2012.01) | |
| H04L 9/32 | (2006.01) | |
| H04L 9/00 | (2022.01) | |

(52) U.S. Cl.
CPC ............ *B33Y 50/02* (2014.12); *G01N 23/046* (2013.01); *G05B 19/4099* (2013.01); *G06F 16/27* (2019.01); *G06F 16/28* (2019.01); *G06Q 10/0633* (2013.01); *G06Q 10/06395* (2013.01); *G06Q 10/087* (2013.01); *G06Q 20/38215* (2013.01); *G06Q 20/389* (2013.01); *G06Q 20/401* (2013.01); *G06Q 30/018* (2013.01); *G06Q 30/0185* (2013.01); *G06Q 30/0631* (2013.01); *G06Q 50/04* (2013.01); *H04L 9/3236* (2013.01); *G05B 2219/49023* (2013.01); *G06Q 2220/00* (2013.01); *G06Q 2220/18* (2013.01); *H04L 9/50* (2022.05)

(58) Field of Classification Search
CPC ............... G06Q 20/401; G06Q 30/018; G06Q 30/0185; G06Q 30/0631; G06Q 50/04; G06Q 2220/00; G06Q 2220/18; B33Y 50/00; B33Y 50/02; B29C 64/393; B29C 64/386; G06F 16/27; G06F 16/28; G01N 23/046; G05B 19/4099; G05B 2219/49023; H04L 9/3236; H04L 9/50
See application file for complete search history.

(56) References Cited

U.S. PATENT DOCUMENTS

| | | | |
|---|---|---|---|
| 8,970,867 B2 | 3/2015 | Baldwin et al. | |
| 9,229,674 B2 | 1/2016 | Tapley et al. | |
| 9,858,360 B2 | 1/2018 | Nelson et al. | |
| 10,002,362 B1 | 6/2018 | Endress et al. | |
| 10,262,281 B1 | 4/2019 | Vitek et al. | |
| 10,513,077 B2 | 12/2019 | Mattingly et al. | |
| 10,520,922 B2 | 12/2019 | Kumar et al. | |
| 10,534,923 B2 | 1/2020 | Narasimhan et al. | |
| 10,558,764 B2 | 2/2020 | Nelson et al. | |
| 10,754,323 B2 | 8/2020 | Freer et al. | |
| 10,846,808 B1 | 11/2020 | Posillico et al. | |
| 10,885,214 B2 | 1/2021 | Gosch et al. | |
| 10,970,669 B2 | 4/2021 | Yund et al. | |
| 10,984,410 B2 | 4/2021 | Smith et al. | |
| 11,102,003 B2 | 8/2021 | Gray et al. | |
| 12,165,069 B1 | 12/2024 | Thomas et al. | |
| 2003/0172366 A1 | 9/2003 | Rhee et al. | |
| 2003/0226032 A1* | 12/2003 | Robert | H04L 63/1458 726/23 |
| 2008/0010410 A1* | 1/2008 | Zilbershtein | H04L 67/5682 711/118 |
| 2008/0186886 A1* | 8/2008 | Cho | H04L 1/1896 370/310 |
| 2011/0119155 A1 | 5/2011 | Hammad et al. | |
| 2012/0105903 A1 | 5/2012 | Pettis | |
| 2013/0018793 A1 | 1/2013 | Wong et al. | |
| 2013/0235412 A1 | 9/2013 | Baldwin et al. | |
| 2014/0074272 A1 | 3/2014 | Cowden, IV | |
| 2014/0115345 A1 | 4/2014 | Maetz et al. | |
| 2014/0156053 A1 | 6/2014 | Mahdavi et al. | |
| 2014/0214684 A1 | 7/2014 | Pell | |
| 2014/0223583 A1 | 8/2014 | Wegner et al. | |
| 2015/0205544 A1 | 7/2015 | Webb et al. | |
| 2015/0221053 A1 | 8/2015 | Tapley et al. | |
| 2015/0350278 A1 | 12/2015 | Sbjörnssund et al. | |
| 2016/0180061 A1 | 6/2016 | Pogorelik et al. | |
| 2017/0132626 A1 | 5/2017 | Kennedy | |
| 2017/0279783 A1 | 9/2017 | Milazzo et al. | |
| 2017/0331896 A1 | 11/2017 | Holloway et al. | |
| 2018/0012311 A1 | 1/2018 | Small et al. | |
| 2018/0068359 A1* | 3/2018 | Preston | G06Q 30/0283 |
| 2018/0094953 A1 | 4/2018 | Colson et al. | |
| 2018/0096175 A1 | 4/2018 | Schmeling et al. | |
| 2018/0136633 A1 | 5/2018 | Small et al. | |
| 2018/0173203 A1 | 6/2018 | Freer et al. | |
| 2019/0037012 A1 | 1/2019 | Stöcker | |
| 2019/0087598 A1 | 3/2019 | Adkins et al. | |
| 2019/0101896 A1 | 4/2019 | Cantrell et al. | |
| 2019/0147174 A1* | 5/2019 | Narasimhan | G06Q 10/0838 726/29 |
| 2019/0158270 A1 | 5/2019 | Berti | |
| 2019/0180291 A1 | 6/2019 | Schmeling et al. | |
| 2019/0316912 A1 | 10/2019 | Maggiore et al. | |
| 2019/0339678 A1 | 11/2019 | Biernat et al. | |
| 2020/0119907 A1 | 4/2020 | Graichen | |
| 2020/0139631 A1 | 5/2020 | Buller et al. | |
| 2020/0171750 A1 | 6/2020 | Beckmann et al. | |
| 2020/0201294 A1 | 6/2020 | Nelson et al. | |
| 2020/0202467 A1 | 6/2020 | Salvo et al. | |
| 2020/0233398 A1 | 7/2020 | Freer et al. | |
| 2020/0333757 A1 | 10/2020 | Belhachemi et al. | |
| 2021/0049671 A1* | 2/2021 | Bhasin | G06Q 10/08355 |
| 2021/0086451 A1 | 3/2021 | Labbe, Jr. | |
| 2021/0114303 A1 | 4/2021 | Cook et al. | |
| 2021/0158370 A1 | 5/2021 | Koudall et al. | |
| 2021/0271229 A1 | 9/2021 | Molcho et al. | |
| 2022/0197306 A1* | 6/2022 | Cella | G05B 19/41865 |

FOREIGN PATENT DOCUMENTS

| | | |
|---|---|---|
| DE | 102017011782 A1 | 6/2019 |
| EP | 3226165 B1 | 4/2019 |
| EP | 3514743 A1 | 7/2019 |
| EP | 3627253 A1 | 3/2020 |
| EP | 3627372 A1 | 3/2020 |
| EP | 3734508 A1 | 11/2020 |
| FR | 3058856 B1 | 11/2018 |
| KR | 10-2019-0010628 A | 1/2019 |
| KR | 10-2019-0100827 A | 8/2019 |
| KR | 10-2020-0130994 A | 11/2020 |
| WO | 2012/146943 A2 | 11/2012 |
| WO | 2013/149296 A1 | 10/2013 |
| WO | 2018/091091 A1 | 5/2018 |
| WO | 2019/045739 A1 | 3/2019 |
| WO | 2019/166773 A1 | 9/2019 |
| WO | 2019/178227 A1 | 9/2019 |
| WO | 2019/178644 A1 | 9/2019 |
| WO | 2020/091746 | 5/2020 |
| WO | 2020/058191 A1 | 6/2020 |
| WO | 2020/259820 A1 | 12/2020 |

OTHER PUBLICATIONS

International Written Opinion for International Application No. PCT/US2022/072293 dated Aug. 26, 2022, 3 pages.
Canadian Office Action for Application No. 3,218,311 dated Jan. 7, 2025, 7 pages.
Extended European Search Report and Opinion for European Application No. 22808540.3, dated Feb. 20, 2025, 8 pages.

* cited by examiner

ADDITIVE MANUFACTURING DISTRIBUTED INVENTORY MANAGEMENT

CROSS-REFERENCE TO RELATED APPLICATION

THIS APPLICATION CLAIMS THE BENEFIT UNDER 35 U.S.C. § 119(e) OF U.S. PROVISIONAL Patent Application Ser. No. 63/188,955, filed May 14, 2021, for "ADDITIVE MANUFACTURING END-TO-END WORKFLOW PROCESSES," the disclosure of which is incorporated herein in its entirety by this reference.

FIELD

This disclosure relates generally to systems and methods for facilitating, controlling, and/or verifying manufacturing of products in a distributed supply chain More specifically, disclosed embodiments relate to systems and methods which may enable aggregation, access control, revision, version tracking, or any combination of these for product designs from different entities; facilitating, controlling, verifying, or any combination of these with respect to manufacturing processes for products in accordance with the product designs, particularly when additive manufacturing is employed; facilitating, controlling, verifying, or any combination of these actions performed for post-manufacture processing, delivery, use, maintenance, refurbishment, or any combination of these services applied to products; and/or facilitating and/or tailoring payment for respective products to different entities having different rights, rates, or both, in a distributed supply chain.

BACKGROUND

Coordinating manufacture of certain products often involves coordination among entities. For example, a buyer may place an order requiring materials and source components to be provided, manufacturing services to be performed, and post-manufacture processing of a product to occur, each of which may involve cooperation among several entities. When making products subject to government and/or industry regulation, and when a buyer imposes certain quality standards, coordination among the companies may also involve certifying source materials and components, calibration of machines, and training and certification of personnel involved in manufacturing those products. When making products made utilizing additive manufacturing (e.g., 3D printing), for example, the source material used, name and model of the machine, calibration for the machine, and certification of the operator may be required in at least some instances, all of which may require coordination and recordkeeping by disparate entities. Additive manufacturing techniques facilitate manufacturing complex shapes with relative ease. Additionally, additive manufacturing facilitates manufacturing component geometries that currently cannot be achieved through certain manufacturing processes such as conventional machining processes.

BRIEF SUMMARY

In some embodiments, systems may include a memory device storing instructions that, when executed by a processor, cause the processor to: send identification of a product to be additively manufactured to a plurality of additive manufacturers. Confirmation from at least one of the plurality of additive manufacturers of availability to additively manufacture the product may be received. Approval of a respective additive manufacturer to additively manufacture the product design may be confirmed. A blockchain inay be updated to associate the approval of the respective additive manufacturer with an encrypted, secure identifier for the product to be additively manufactured utilizing a secure, distributed transaction ledger. Discrete packets of operational parameters to enable an additive manufacturing device to manufacture the product may be generated. Each packet may include operational parameters to enable the additive manufacturing device to manufacture a respective portion of the product. Respective packets of operational parameters may be encrypted and sent to a network-connected additive manufacturing device. The respective packets may be sent only after receipt of confirmation that at least another previous packet is complete and associated operational parameters for the at least another previous packet have been deleted. A time from completion of the at least another previous packet may be sufficient to ensure that another respective portion of the product to be manufactured responsive to execution of a subsequent packet may begin without interruption in an additive manufacturing process. The blockchain may be updated to associate the encrypted packets of operational parameters with the encrypted, secure identifier utilizing the secure, distributed transaction ledger.

In other embodiments, methods may involve sending identification of a product to be additively manufactured to a plurality of additive manufacturers. Confirmation from at least one of the plurality of additive manufacturers of availability to additively manufacture the product may be received. Approval of a respective additive manufacturer to additively manufacture the product design may be confirmed. A blockchain may be updated to associate the approval of the respective additive manufacturer with an encrypted, secure identifier for the product to be additively manufactured utilizing a secure, distributed transaction ledger. Discrete packets of operational parameters to enable an additive manufacturing device to manufacture the product may be generated. Each packet may include operational parameters to enable the additive manufacturing device to manufacture a respective portion of the product. Respective packets of operational parameters may be encrypted and sent to a network-connected additive manufacturing device. The respective packets may be sent only after receipt of confirmation that at least another previous packet is complete and associated operational parameters for the at least another previous packet have been deleted. A time from completion of the at least another previous packet may be sufficient to ensure that another respective portion of the product to be manufactured responsive to execution of a subsequent packet may begin without interruption in an additive manufacturing process. The blockchain may be updated to associate the encrypted packets of operational parameters with the encrypted, secure identifier utilizing the secure, distributed transaction ledger.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings. In the drawings:

DETAILED DESCRIPTION

Figure 1:
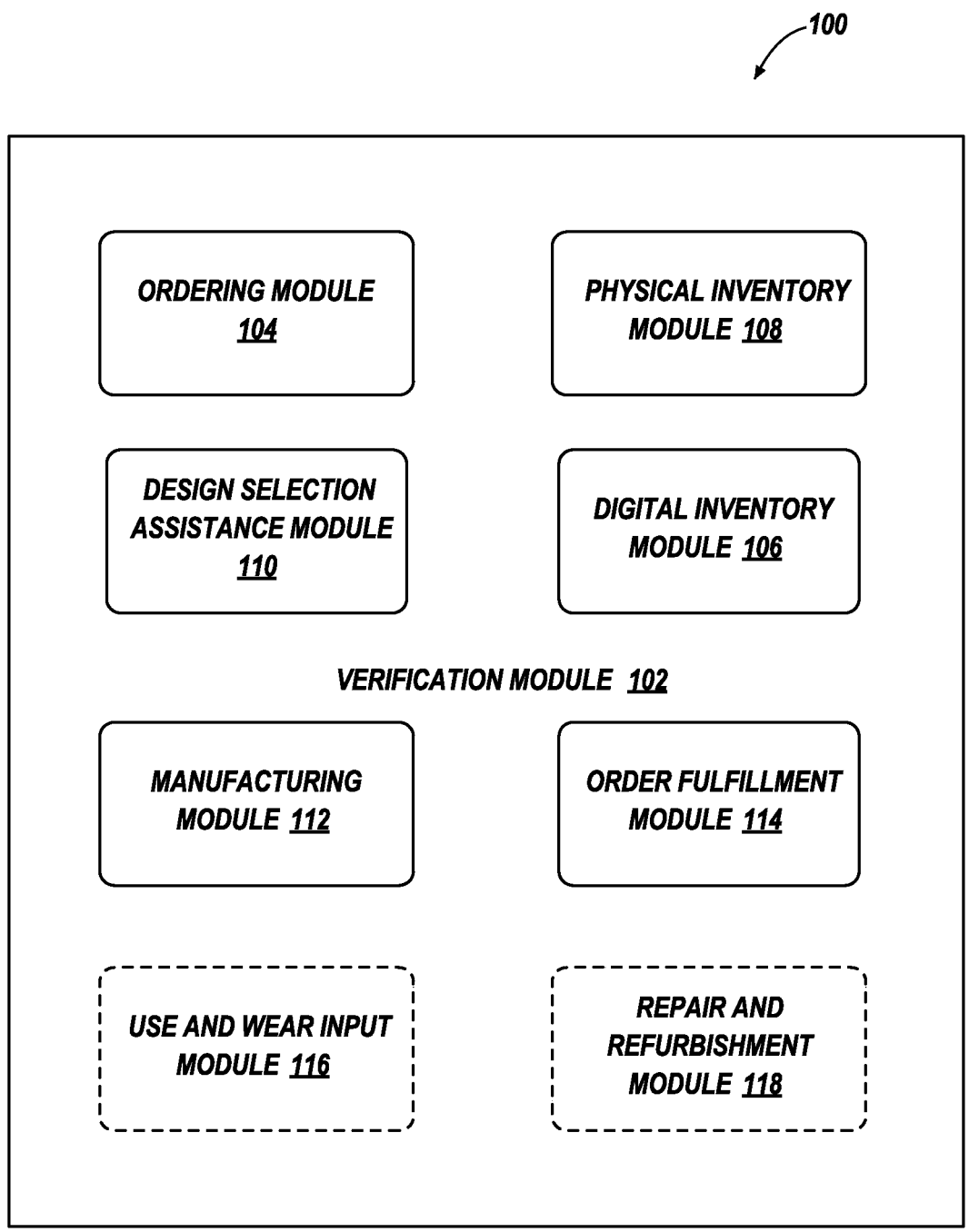
FIG. 1 is a schematic view of a system for end-to-end verification of workflow processes for a product.

The illustrations presented in this disclosure are not meant to be actual views of any particular system, act in a method, or component thereof, but are merely idealized representations employed to describe illustrative embodiments. Thus, the drawings are not necessarily to scale.

Disclosed embodiments relate generally to systems and methods which may enable aggregation, access control, revision, version tracking, or any combination of these for product designs from different entities; facilitating, controlling, verifying, or any combination of these with respect to manufacturing processes for products in accordance with the product designs, particularly when additive manufacturing is employed; facilitating, controlling, verifying, or any combination of these actions performed for post-manufacture processing, delivery, use, maintenance, refurbishment, or any combination of these services applied to products; and/or facilitating and/or tailoring payment for respective products to different entities having different rights, rates, or both, in a distributed supply chain. More specifically, disclosed are embodiments of systems, including software and hardware, for facilitating cooperation among different entities in a distributed supply chain for products, which may be used at various phases of a product lifecycle, including design, precursor sourcing, manufacturing, post-processing, payment, delivery use, maintenance, and refurbishment, to provide appropriate parties with control over, and verification of, at least certain aspects of those phases. Such control and verification may reduce risk of theft and copying, may ensure verification of requested variables throughout the relevant portions of the process, and may reduce burdens associated with verifying product characteristics, quality, accuracy, and performance.

For a valid product qualification certification, for each part manufactured there may be dozens, if not hundreds or thousands, controlled variables requiring verification. For example, variables to be verified may include sourcing and characteristics of product precursors, certification of manufacturing device capability to produce within specified tolerances, calibration of manufacturing devices, certification of device operators, consistency of manufacturing and post-manufacture processes with product specification, and product characteristics. Some verifications may be provided by a machine output, and some others may be harvested from up-the-supply-chain vendor qualifications (raw material for example). The process to collect, verify, store, and make verifications available for inspection for each part may typically be accomplished by discrete manual processes. In accordance with this disclosure, an encrypted, secure identifier per product may be generated and associated with a digital ledger to automatically harvest qualification and certification data, directly from Internet-of-things manufacturing devices in at least some instances. The resulting digital ledger may be shared with a reviewer (e.g., a customer, a government representative) for validation and time stamping. Processes and materials provided by up-the-supply-chain vendors may be recorded into the digital ledger (optionally with supporting documentation) with restrictive access. Such a digital ledger may reduce burdens associated with audits to verify all the quality required documentations.

Authorization and verification techniques in accordance with this disclosure may be implemented in connection with additive manufacturing devices and products adapted to be manufactured utilizing additive manufacturing processes. Adaptations to product designs, 3D part files, and manufacturing specifications to facilitate manufacturing by additive manufacturing processes may be subject to intellectual property rights distinct from any intellectual property rights attaching to the underlying product, product design, methods of manufacturing the product by other techniques, and precursor materials and components. For example, such adaptations may implicate patent rights, trade secret rights, knowhow, or a combination of these rights, which may or may not be held by the same entity having rights in the underlying product, product design, methods of manufacturing, and precursor materials and components. Such concerns may be amplified when manufacturing is decentralized and remotely produced across the globe. Verifying and tracking the location and number of reproduction for proper distribution is practically impossible with a manual structure. Verification of rights, rights holders, corresponding royalties, distribution of product designs and product specifications, and manufacture and distribution of authorized products and as the products are being produced within an additive manufacturing supply chain may be simplified when manufacturing and verifying in accordance with the techniques disclosed herein. In some examples, manufacturing and verifying in accordance with this disclosure may involve generating discrete data packages that unlock in sequence as instructions to the additive manufacturing devices are receiving them remotely. Such an approach may enable greater control over the exact numbers of products produced per machine, and record required or requested information relevant to the production (e.g., on a digital ledger).

The structure and operation of systems in accordance with this disclosure may incentivize partners in a distributed manufacturing network to adopt and participate in the platform. For example, each vendor registered with the platform may receive a commission or distribution of each transaction to which a given vendor contributed, or simply a commission or distribution of each transaction handled by the platform during a period of time in which the given vendor actively participated in the platform. Such an approach may enable at least some participants to access technologies that a given participant is not yet ready to deploy at scale. For example, in the routing of an order in at least some examples, information relevant to the order may pass from a (1) Marketplace App to a (2) Design Tool App, to a (3) Pre-Qualification app, to a (4) Process monitoring app, to an (5) inspection app to a (6) Post Processing app, to a (7) Delivery Tracking app, to a (8) Digital warehouse app, to a (9) Category management app, or any combination of these. Interaction between various apps may be tracked and stored in a (10) digital ledger, and printed through a (11) security layer app. While in this example interactions among eleven potentially distinct applications may be handled by the platform, only some of those applications may be required to implement a given segment of the platform, with network partners maintaining others of the applications. Monetization of various portions of the platform may be handled through an automatic payment system, for example, linked to a given secure identifier for a specific product or manufacturing job.

When implementing systems in accordance with this disclosure in connection with additive manufacturing, sustainability advantages may be realized across product and material life cycles. For example, additive manufacturing can improve resource efficiency and enable closed-loop material flows. These contributions can be monitored, as well as the process steps realizing these contributions, and either or both may be captured in the digital ledger. The digital ledger may be utilized to calculate automatically a sustainability index, potentially in real time, which may assist participants in realizing sustainability objectives.

In some examples, at least some aspects of contracting, invoicing, payment, or any combination of these tasks may be handled by the system. For example, terms relevant to manufacturing the product (e.g., features, quality, verification) may be established when accepting an order. The system may automatically track and verify fulfillment of the terms (e.g., utilizing the one or more smart contracts enabled by the blockchain). The system may also automatically handle invoicing, payment, or both, responsive to fulfillment of the terms, optionally by automatically requesting or effecting payment through a connected payment processor (e.g., utilizing an application programming interface (API)). Such functionality may beneficially reduce timing during which payment is outstanding, may reduce invoicing errors or discrepancies, and improve cash flow and operating income efficiency for users.

In some examples, control over a secure, distributed transaction ledger may be shared between multiple entities participating in the system, potentially requiring consensus among the parties for at least some updates to be made to the secure, distributed transaction ledger. Consensus control may reduce risks of differing interpretation, delays, and miscommunication among the participants. By confirming the qualification process utilizing the system, and with a commercial contract in place validating it, the system may serve as an alternative to (or replace) regulations or standards conventionally employed for qualification, manufacturing, and fulfillment. Such an improved system may reduce risks and liabilities for participants in case of operational failures and disputes.

As used herein, the terms "substantially" and "about" in reference to a given parameter, property, or condition mean and include to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

The terms "memory" and "memory device," as used herein, include microelectronic devices exhibiting, but not limited to, memory functionality, but exclude embodiments encompassing transitory signals. For example, a system on a chip (SoC) is encompassed in the meaning of memory device. By way of non-limiting example, memory devices may generally include Synchronous Random Access Memory (SRAM), Dynamic RAM (DRAM), Read-Only Memory (ROM), Flash memory, and the like, unless otherwise specified.

FIG. 1 is a schematic view of a system 100 for end-to-end verification of workflow processes for a product. The system 100 may be at least partially implemented via software executable on one or more computer systems in connection with one another over a network. The system 100 may include a verification module 102 programmed and configured to generate, receive, and maintain a secure record of at least some workflows in the manufacture of a product. For example, the verification module 102 may be programmed and configured to receive data from other modules of the system 100, to maintain and update a secure, distributed transaction ledger with at least some of the data received and/or with generated data representative of at least some content of the received data, and to control access to the secure, distributed transaction ledger to ensure the secure, distributed transaction ledger accurately reflects those portions of the workflows to be represented in the secure, distributed transaction ledger.

The verification module 102 may be programmed and configured to generate an encrypted, secure identifier for each product to be made, the encrypted, secure identifier configured to identify the physical product, once made, and enable data verifying workflows for manufacturing the product to be collected and verified. In some examples, the verification module 102 may also be termed a "security module" or may include a security module as a sub-module within the verification module 102. For example, upon initiation, and/or receipt, of an order, the verification module 102 may be programmed and configured to generate and encrypt an at least substantially unique identifier to be tied to each subsequent update in the secure, distributed transaction ledger relevant to the product. In some examples, the verification module 102 may query or execute a random output generator (e.g., a non-deterministic random number generator, a pseudorandom number generator, a pseudorandom number generator seeded by a non-deterministic random number generator) to generate a string of bits (e.g., a 128-bit string, a 256-bit string, a 512-bit string) to be encrypted and serve as the encrypted, secure identifier. In other examples, the verification module 102 may query a database of previously used encrypted, secure identifiers (e.g., in a secure, distributed transaction ledger) to retrieve a last-used encrypted, secure identifier, decrypt the last-used encrypted, secure identifier, and alter the last-used encrypted, secure identifier (e.g., following a pattern, making an incremental change in a sequence) to generate a new encrypted, secure identifier for the product. As a specific, nonlimiting example, the encrypted, secure identifier may include a hash value, which may be utilized to chain subsequently generated data relevant to the product together, forming an at least substantially unique, inalterable fingerprint for verifying the data and its association with the product (e.g., by generating a new, validated fork in a secure, distributed transaction ledger).

The encrypted, secure identifier may be utilized to establish and maintain a secure record verifying at least some workflows in the life cycle of the product, from ordering, through manufacturing, post-processing, fulfillment, delivery, use in the field, repair, refurbishment, retirement, or any combination or subcombination of these. For example, the verification module 102 may update a blockchain with the encrypted, secure identifier to establish a record verifying the workflows for the product utilizing a secure, distributed transaction ledger. More specifically, the verification module 102 may establish a new block in the blockchain including the encrypted, secure identifier (e.g., continuing an existing fork or starting a new, temporary fork pending validation), the new block dedicated to storing data verifying the workflows associated with the product and chained to a previous block, may update a not-yet-complete block in the blockchain to incorporate the encrypted, secure identifier, or may establish a new blockchain altogether to incorporate the encrypted, secure identifier.

In some examples, the encrypted, secure identifier may be or include a token (e.g., a non-fungible token) operable in multiple blockchains (e.g., based on the same or different cryptographic algorithms). For example, the encrypted, secure identifier may include a cross-chain token in accordance with U.S. Pat. No. 11,102,003, the disclosure of which is incorporated herein in its entirety by this reference. Briefly, the encrypted, secure identifier may be generated by invoking a token template defined by a set of attributes and control functions representative of a given asset (e.g., the product). When a token is created by the template, the token may incorporate the attributes and control functions of the template, which may then be deployed across multiple blockchains and recognized as a cross-chain token. Configuring the encrypted, secure identifier may facilitate storage of different sets of data in different blockchains while enabling the data to be interlinked to the encrypted, secure identifier to provide a secure, wholistic record of data relevant to a given product.

Encryption and decryption techniques utilized by the verification module 102 may be adopted, configured, maintained, and utilized to ensure security of files handled by the verification module 102. In some examples, the encryption utilized may be asymmetric. For example, the verification module 102 may utilize a public key to encrypt data to be sent to a given participant in the system 100 (e.g., a customer, a designer, a manufacturer, an auditor) or otherwise to be used by a module of the system 100, and a private key held solely by that participant and/or module may be required to decrypt the data. The private key, and optionally the public key, may be selected and distributed when screening and authenticating potential participants for participation in the system 100. Illustrative asymmetric encryption techniques usable by the verification module 102 may include, for example, Digital Signature Standard (DSS), Elliptic Curve Digital Signature Algorithm (ECDSA), Paillier cryptosystem, Rivest-Shamir-Adleman (RSA) encryption algorithm, etc. In other examples, the encryption utilized by the verification module 102 may be symmetric. For example, the verification module 102 may utilize a private key to encrypt data to be sent to a given participant in the system 100 or otherwise to be used by a module of the system, and the same private key may be required to decrypt the data. The private keys may be selected and distributed in advance, such as, for example, when screening and authenticating potential participants for participation in the system 100. Illustrative asymmetric encryption algorithms usable by the verification module 102 may include, for example, Twofish, Serpent, AES (Rijndael), *Camellia*, Salsa20, ChaCha20, Blowfish, CAST5, Kuznyechik, RC4, DES, 3DES, Skipjack, Safer, and IDEA.

When data relevant to the product becomes available and the system 100 has been configured to record the data, the verification module 102 may accept the data from another module, optionally encrypt the data, and update the blockchain to include the data in such a way that the data is associated with the encrypted, secure identifier of the product. For example, data automatically generated utilizing one of the modules, or accepted by one of the modules via user input, may also be received by the verification module 102. The verification module 102 may optionally encrypt the data, and the verification module 102 may update a blockchain with the data, and associate the data with, or link the data to, the encrypted, secure identifier, to update and maintain the record verifying the workflows for the product utilizing the secure, distributed transaction ledger. More specifically, the verification module 102 may establish a new block in the blockchain including the data and a link or reference to the block including the encrypted, secure identifier, may update a not-yet-complete block in the blockchain already including the encrypted, secure identifier to incorporate the data, or may update a blockchain dedicated to the product with the data.

Updating the blockchain with the data may involve, for example, collecting the data in a block, generating a hash to verify the data, and incorporating a hash from a previous block in the blockchain to chain the block including the data to the previous block. When a node (i.e., a computer system authorized to participate in the blockchain) generates a block to be added to the blockchain, consensus from at least one other node on the blockchain network may be requested (e.g., required) to validate the block and officially add it to the blockchain. For example, when a node operated by a manufacturer generates data containing verification of operational parameters utilized by a manufacturing device to manufacture a product, the verification module 102 may query at least one other node (and potentially all other nodes) participating on the blockchain to confirm acceptance of the data, potentially prompting review of the data. When acceptance by the relevant node or nodes has been received, a hash may be generated and applied to the block along with the hash from any preceding block, and the block with the applied hashes may be distributed to the nodes to add the block and update the blockchain. Any proposed changes to (e.g., revisions of) the blockchain may likewise request (e.g., require) consensus from at least one other node on the blockchain network.

The system 100 may include an ordering module 104 programmed and configured to accept an order and to transmit data representative of the order to the verification module 102 for addition to the blockchain to verify subsequent data relevant to the product. For example, the ordering module 104 may be configured to accept input of a product identification number, a product name, one or more characteristics to be exhibited by the product, one or more performance metrics to be achieved by the product, one or more expected uses for the product, or any combination of these to facilitate ordering of a suitable product. More specifically, the ordering module 104 may send a web form to a client device of a potential customer, the web form containing, for example, a search bar, a series of drop-down menus, one or more checkboxes, an array of product names and/or images, or any combination of these or other user interface elements to accept the input for identifying a suitable product to be ordered. Upon acceptance of a suitable identification of the product, the ordering module 104 may send data representative of the product to the verification module 102 for generation of the encrypted, secure identifier and any associated block or blocks in the blockchain to identify the product and any other terms associated with the order.

The ordering module 104 may also be configured to accept input of one or more terms associated with the order. For example, the ordering module 104 may be configured to accept input of a requested or required date for completion of manufacturing, requested or required date for completion of post-processing, requested or required delivery date, delivery instructions, number of products to be manufactured, requested or required precursors for manufacturing the product (e.g., source materials, preformed components), requested or required verification data to be received at the verification module 102 for the precursors, requested or required manufacturer identity, requested or required manufacturing processes for manufacturing the product (e.g., with associated tolerances), requested or required manufacturing devices for manufacturing the product, requested or required verification data to be received at the verification module 102 for workflows utilized when manufacturing the product (e.g., manufacturer identify, manufacturing device(s) utilized, operational parameters utilized, certifications for device operators, calibration for one or more of the manufacturing device(s)), requested or required post-manufacture processing to be performed on the product, requested or required verification data to be received at the verification module 102 for workflows utilized when performing post-manufacture processing on the product (e.g., processes utilized, devices utilized, operational parameters utilized), requested or required post-manufacture product characteristics (e.g., density, dimensions, adherence to tolerances, surface roughness), requested or required verification data to be received at the verification module 102 for post-manufacture product characteristics of the product and/or workflows utilized to generate the verification data (e.g., processes utilized, devices utilized, operational parameters utilized, calibration for one or more of the device(s)).

In some examples, the ordering module 104 may include smart contract functionality enabled by the blockchain. For example, when an order is accepted via the ordering module 104, a smart contract incorporating the required product characteristics and any other required terms may be sent from the ordering module 104 to the verification module 102. The verification module 102 may update the blockchain to include a smart contract incorporating the required product characteristics and any other required terms. When the verification module 102 updates the blockchain with verification of the required product characteristics and verification of fulfillment of any other required terms, the smart contract may execute, triggering payment obligations. In some examples, execution of the smart contract may automatically initiate transfer of payment from a customer account to one or more service provider accounts. More specifically, execution of the smart account may prompt automatic transfer of a blockchain-enabled currency (i.e., a cryptocurrency) from a customer account to one or more service provider accounts via the verification module 102 interfacing with the blockchain, may prompt automatic transfer of funds from a connected account (e.g., a bank account) to one or more service provider accounts when preauthorization to withdraw funds has been granted by the customer, or may prompt automatic invoicing, requesting payment from the customer, when preauthorization to withdraw funds has not been granted by the customer.

In some examples, the system 100 may be configured to accept and verify intellectual property rights held by one or more parties in a given product design, and to ensure any royalties due for a product manufactured in accordance with those intellectual property rights are assessed and distributed to appropriate parties. For example, any intellectual property rights that a party claims in a product design may be identified and verified during a prequalification process for accepting that party's participation in the system 100. More specifically, any intellectual property rights, such as, for example, patent, trademark, copyright, trade secret, or other intellectual property rights, covering the material, shape, configuration, or other features of a product, or covering methods of making or using the product, may be verified during prequalification. Any licensing and royalties required by the rights-holder may also be prequalified in the system 100. When a customer wishes to place an order for a product in which other parties have intellectual property rights, the ordering module 104 may confirm that the customer has or can acquire an appropriate license. For example, the rights-holder(s) may provide licenses through the system 100 on fixed terms utilizing smart contracts.

The system 100 and smart contract system may also automatically ensure that any royalty payments from the customer are appropriately sent to the rights-holder upon fulfillment of the respective portion of the order implicating those rights. For example, the system 100 may require up-front payment of royalties for acquiring a license when placing an order through the ordering module 104, may require payment of royalties when precursor materials or components are acquired, may require payment of royalties upon manufacture and/or post-processing of the product, may require payment of royalties upon sending or delivery of the product, or may require payment at any combination or subcombination of these events.

In some examples, the system 100 may automatically request funds from a payment account when royalties are due. For example, when a royalty-triggering event occurs, the system may automatically execute at least a royalty-bearing portion of a smart contract utilizing the secure, distributed transaction ledger to cause purchaser funds to be released to the rights holder(s).

The system 100 may include a digital inventory module 106 programmed and configured to maintain and access a database storing a digital inventory including data sufficient to identify and manufacture respective product designs. For example, the digital inventory may include product identifiers (e.g., product numbers), product names, marketing information for the products, images and/or renders of products, recommended use cases, product designs, 3-dimensional product model files, product specifications, or any combination of these data and potentially other data for a product's lifecycle. In some examples, the digital inventory may be maintained cooperatively by the digital inventory module 106 and the verification module 102 on a blockchain. For example, verification data for verifying workflows may be maintained and stored by the verification module 102 on a first blockchain, and the digital inventory may be maintained and stored cooperatively by the verification module 102 and the digital inventory module 106 on a second, discrete blockchain separate from the first blockchain. Any interaction of data to take place between the first blockchain and the second blockchain may be managed by the verification module 102 and/or the digital inventory module 106 to ensure the confidentiality of data to be protected from unrestricted public view. Provision of data on any of the blockchains at least partially managed by the verification module 102 to any entities not already authorized and participating on those blockchains may likewise be managed by the verification module 102, particularly when unrestricted, decrypted access is requested. In other examples, the digital inventory may be stored in a private, encrypted database with access restricted to preauthorized entities (e.g., the digital inventory module 106).

When interfacing with the ordering module 104, the digital inventory module 106 may be configured to access and provide information sufficient to identify a product, and to refrain from accessing or providing confidential information about a product. For example, when accepting a product design to be added to the database storing the digital inventory, a designer or other owner of a given product design may designate certain portions of the data as being freely accessible to the public, certain portions of the data as being accessible only to certain identified entities, certain portions of the data as being accessible only to manufacturers, certain portions of the data as being accessible only to network-connected manufacturing devices and/or control devices for controlling manufacturing devices, or any combination of these controls on accessibility. When stored, all the data in the digital inventory may be encrypted, and the verification module 102 may selectively decrypt certain files in the digital inventory to be provided to the ordering module 104 and ultimately to a prospective purchaser. For example, the verification module 102 may selectively decrypt only those files predesignated by any rights holders in the product as being authorized for unrestricted public view (e.g., product name, marketing information, selected product characteristics, images and/or renders of an exterior of the product). In some examples, the data may be re-encrypted by the verification module 102 before sending to a client device by the ordering module 104. For example, the data may be re-encrypted in accordance with a hypertext transfer protocol secure (HTTPS) standard to ensure secure, verifiable communication to the client device.

For any product designs in the digital inventory, the digital inventory module 106 may maintain a version history. For example, when a designer updates, revises, changes, edits, or otherwise modifies a product design, a new version of the product design may be stored in the digital inventory or made available via a link in the digital inventory, with master source files for the product design being stored and secured by a third party (e.g., a designer, a manufacturer, a third-party storage provider). More specifically, each version of a product design may be tracked with, for example, its own respective encrypted, secure product identifier (e.g., a hash) utilized to uniquely identify a given version of the product design within a secure, distributed transaction ledger of a blockchain of the digital inventory. When implemented utilizing a blockchain, version history of each product design on the secure, distributed transaction ledger may automatically be tracked and verified by virtue of operation of the blockchain. In some examples, a rights holder in an earlier version may restrict access to the earlier version, such that old versions of product designs may not be accessible to the ordering module 104 for presentation to a potential customer. Thus, a user of the system 100 may be assured that any product ordered through the system 100 may be a most up-to-date version or design of a given product. In some situations, an old version of a product design may be eliminated from the digital inventory altogether (e.g., upon consensus from all nodes and/or participants in the digital inventory). In other examples, multiple versions of a given product design may be made available to the ordering module 104, enabling a designer or other rights holder to offer multiple versions (e.g., for different use cases, at different price points).

In some examples, the system 100 may include a physical inventory module 108 programmed and configured to track and analyze a physical inventory of one or more entities participating in the system. For example, the physical inventory module 108 may be configured to track and analyze stock of precursor materials, precursor components, products, or any combination of these inventory items in a physical inventory of each respective entity granting authorization for the physical inventory module 108 of the system 100 to access that entity's physical inventory. More specifically, the physical inventory module 108 may be configured to interface with an existing inventory tracker utilized by an entity (e.g., utilizing an API) and receive automatic updates regarding the contents of that entity's physical inventory, at least with respect to selected precursors and/or products. Data received by the physical inventory module 108 may be stored, for example, in a database discrete from any blockchain, or in a third blockchain discrete from any other blockchain for product lifecycle verification and or digital inventory management. Data receivable by the physical inventory module 108, and storage policies for the data, may be tailored to a user's preferences.

When an entity connects to the ordering module 104, the physical inventory module 108 may optionally provide information regarding the current contents of that entity's physical inventory. For example, the physical inventory module 108 may filter contents of the entity's physical inventory to send the names and current stock of similar products to those searched and/or viewed by the entity utilizing the ordering module 104. In some examples, the physical inventory module 108 may proactively analyze an entity's physical inventory and a rate of depletion of the entity's physical inventory. For example, the physical inventory module 108 may send a notification to a user of a current quantity of a given product and an estimated time at which stock is predicted to fall below a predetermined minimum with sufficient lead time for the user to place an order for one or more products utilizing the ordering module 104 and for those products to be manufactured and delivered before stock falls below the predetermined minimum. As another example, the physical inventory module 108 may automatically place an order with the ordering module 104 for a given product at a predetermined interval before a predicted depletion of stock of the product in the physical inventory, such as, for example, timed so that the product will likely be manufactured and delivered before stock falls below the predetermined minimum.

In some examples, the system 100 may include a design selection assistance module 110 programmed and configured to provide recommendations to a prospective customer searching within the ordering module 104 of product designs, specifications, and/or materials that may potentially suit the prospective customer's use case. When the ordering module 104 receives inputs in search of a product in the digital inventory, particularly when those inputs do not identify a specific product, the design selection assistance module 110 may be programmed and configured to analyze those inputs, search the digital inventory for product designs, or search in a materials database for materials and/or a specification database for specifications, most closely matching the inputs, and provide one or more closest matching products, materials, and/or specifications for output as potential recommended product designs. For example, receipt of inputs representing expected uses for a product, absent corresponding identification of a desired product for performing the expected uses, may trigger the design selection assistance module 110 to search the digital inventory for product designs having the closest recommended use cases, product designs having the closest verified in-field performance, or both, and output a subset (e.g., a list with a predefined number of results, a list with a number of results corresponding to an available area on a display of a client device) of the digital inventory to recommend those product designs for potential selection. In some examples, the design selection assistance module 110 may include an artificial-intelligence assisted, machine learning algorithm, enabling the design selection assistance module 110 to adaptively provide recommendations based on a wholistic analysis of the inputs as well as other potentially relevant data (e.g., order history, popularity rankings of product designs).

Upon acceptance of an order utilizing the ordering module 104, the verification module 102 may generate the encrypted, secure identifier for the product to be manufactured and update the blockchain for verifying workflows relevant to the lifecycle of the product to include the encrypted, secure identifier, sufficient information to identify the product and version, and any other terms required or requested for fulfillment in connection with manufacturing, post-processing, and delivery of the product. For example, the verification module 102 may generate a "digital twin" of the product to be manufactured, including the encrypted, secure identifier, sufficient information to identify the product, sufficient information to facilitate manufacturing the product, and any other terms in the order, and store the digital twin in the secure, distributed transaction ledger with the encrypted, secure identifier. Any smart contract to be executed in connection with the product may also be stored on the blockchain in connection with the digital twin.

After acceptance of the order, a manufacturing module 112 of the system 100 may coordinate manufacturing of the product or products in accordance with the terms set forth in the order. In some examples, the system 100 may be vertically integrated, with a single entity accepting the order from the ordering module 104, manufacturing the product, and fulfilling the order. In other examples, the system 100 may be at least partially decentralized, with the ordering module 104 and the manufacturing module 112 coordinating fulfillment of a given order or orders by multiple entities. Regardless, manufacturing instructions including at least precursors required to begin manufacturing, manufacturing devices to be used, the product, and any other terms necessary for the manufacturer to know up-front when preparing to manufacture the product (e.g., delivery date, verification data required) may be sent to the entity or entities coordinating fulfillment of the order. To protect details of the product designs from inadvertent disclosure, all transmission of data for manufacturing the product by the manufacturing module 112 to a client device may be encrypted. For example, the manufacturer(s) may be required to utilize a respective private key established when setting the system 100 in place to decrypt the information enabling the manufacturer(s) to make preparations to manufacture the product.

Prior to receiving any further instructions for manufacturing the product from the manufacturing module 112, any manufacturer may be required to send verification of predetermined preliminary qualifications to the verification module 102 in some examples. For example, a manufacturer may be required to send, and the system 100 may require receipt of, verification that precursor materials to be used are in possession of the manufacturer, that precursor components to be used are in possession of the manufacturer, that manufacturing devices having required capabilities are in possession of the manufacturer, the manufacturing devices to be used have been calibrated in accordance with customer and/or industry standards, operators have any required certifications and/or training, or any combination or subcombination of these preliminary qualifications. Accepting such preliminary qualifications for verification may involve, for example, receiving an upload of another encrypted, secure identifier associated with a prequalification portfolio of the manufacturer stored in a database of preverified manufacturer qualifications and/or capabilities (e.g., another blockchain), which may be accessible to a recipient of the encrypted, secure identifier through the verification module 102.

In some examples, updating the blockchain, particularly to add a new block to the blockchain, may require acceptance of the relevant data to be by consensus of at least some of the other parties already qualified within the system 100. For example, the system 100 may require acceptance of the relevant data by consensus of each party hosting a node of the blockchain. As another example, the system 100 may require acceptance of the relevant data by consensus of each party participating in the blockchain.

As another example, accepting preliminary qualifications may involve receiving verification of manufacture of a witness mass including the same material(s) and optionally the same material composition as at least a portion of the product is to be manufactured from. To tie the witness mass to the encrypted, secure identifier of the product, one or more physical characteristics of the witness mass may be altered, and the alteration stored in the blockchain in connection with the encrypted, secure identifier to indicate that detection of the identified physical characteristics in the witness mass is representative of the materials and manufacturing processes to be used for the product. More specifically, the manufacturing module 112 may instruct a network-connected additive manufacturing device to control one or more operational parameters (e.g., material feed rate, material dispenser position and/or movement rate, position and/or intensity of applied heat) to produce a randomized variation in one or more product characteristics (e.g., density, surface roughness, distribution of different materials) in one or more portions of the witness mass (e.g., in a layer thereof, on an exterior surface thereof). The verification module 102 may encrypt and store data representative of the randomized variation in the blockchain such that the data representative of the randomized variation is associated with the encrypted, secure identifier of the product. An entity wishing to audit the workflow for the product may inspect the witness mass to detect the randomized variation send the randomized variation to the verification module 102, and receive from the verification module 102 an indication of the encrypted, secure identifier associated with the randomized variation and the product.

As yet another example, accepting preliminary qualifications may involve receiving timestamped images of manufacturing devices, calibration certificates, training and/or qualification certificates for operators, or any combination or subcombination of these preliminary qualifications. The timestamped images may be received at the verification module 102, encrypted, and stored in the blockchain in connection with the encrypted, secure identifier for the product.

In some examples, the verification of precursors to manufacture the product may include data regarding the sustainability of materials and components to be used when making the product. For example, the verification module 102 may request or require receipt of indications of the environmental impact of sourcing the precursors and their sustainability. More specifically, the verification module 102 may request or require receipt of indications of, for example, whether the precursors a recycled from a previous product, a measure of green-house gas emissions from sourcing the precursors, an indication whether the precursors are from a renewable source, an indication how the precursors may be reused or recycled upon retirement of the product, or any combination or subcombination of these or other indications of sustainability. Upon receipt, the verification module 102 may update the blockchain to associate received indications of sustainability with the encrypted, secure identifier. In some examples, the verification module 102 may also calculate an impact the verified indications of sustainability have on an entity's target environmental and sustainability goal, such as, for example, by recalculating a sustainability score of the entity (e.g., by rating whether the entity is on track to, predicted to be 10% or closer off track from, or predicted to be more than 10% off track from meeting sustainability targets) based on the added indications.

After acceptance of any verification for any preliminary qualifications, the manufacturing module 112 may send further instructions for manufacturing the product. In some examples where the manufacturing device(s) to be used may not be automatically controlled, the verification module 102 may send an encrypted file including a specification, tolerances, and any other manufacturing instructions to be decrypted by the manufacturer utilizing a private key. The encrypted file may be decryptable by the manufacturer and may contain sufficient information for the manufacturer to manufacture the product in accordance with requirements and preferences in the order.

In other examples where the manufacturing device(s) to be used may be automatically controlled, the verification module 102 may generate or access pre-generated instructions configured to cause the manufacturing device(s) to automatically manufacture the product, encrypt the instructions, and send the encrypted instructions to the manufacturing device(s) for decryption and use to automatically manufacture the product from the precursors utilizing the manufacturing device(s). For example, the verification module 102 may determine a rate at which a manufacturing device (e.g., an additive manufacturing device) may be capable of manufacturing the product, may encrypt and send a packet of instructions to the manufacturing device, the packet containing only so many instructions to enable the manufacturing device to manufacture a portion of the product upon decryption of the packet of instructions utilizing the manufacturer's private key. As the manufacturing device manufactures the product, the manufacturing module 112 may encrypt and send another packet of instructions to the manufacturing device, the other packet containing instructions to enable the manufacturing device to manufacture a subsequent portion of the product upon decryption of the packet of instructions utilizing the manufacturer's private key. The respective packets may contain instructions so that a preceding packet may be fully executed, manufacturing the relevant portion of the product, deleted, and deletion confirmed to the verification module 102 while the manufacturing device executes the instructions in a subsequent packet. The respective packets may also contain instructions so that manufacturing processes are not interrupted following deletion of the preceding packet and before a still subsequent packet can be received (e.g., layer by layer when a given packet includes sufficient instructions to manufacture an associated layer). With such a process, manufacturing may be efficiently and expeditiously completed, though the manufacturer may never be granted access to a full, unencrypted set of instructions for manufacturing the product.

In some examples, the packets of instructions may be generated and transmitted by granting the manufacturer (or the manufacturing device) temporary access to one or more private keys of a blockchain storing the packets of instructions. The blockchain may automatically record access to, transmission of, and deletion of copies of the instructions by a client device, ensuring that the manufacturer's access and use of the data is in accordance with terms in the order and any terms set by a designer or other rights holder in the product design (and providing an immutable record of any improper access, use, and copying). reverse-engineered utilizing the record. In other examples, the verification module 102 may compare a completed record of the operational parameters utilized by the manufacturing device to a product specification, including any tolerances, and update the secure, distributed transaction ledger with an indication that manufacturing was within specification or was outside specification.

In some examples, the verification of operational parameters of manufacturing devices while the product is being made may include data regarding the sustainability of manufacturing processes and materials used when making the product. For example, the verification module 102 may request or require receipt of indications of the environmental impact of manufacturing the precursors into the product and the sustainability of manufacturing processes utilized to produce the product. More specifically, the verification module 102 may request or require receipt of indications of, for example, energy expended in manufacturing the product, source of the energy expended in manufacturing the product, a measure of green-house gas emissions from energy expended in manufacturing the product, identification of any lubricants and/or coolants used when manufacturing the product, whether the lubricants and/or coolants used when manufacturing the product are reusable, recyclable, and/or biodegradable, or any combination or subcombination of these indications of sustainability. Upon receipt, the verification module 102 may update the blockchain to associate received indications of sustainability with the encrypted, secure identifier. In some examples, the verification module 102 may also calculate an impact the verified indications of sustainability have on an entity's target environmental and sustainability goal, such as, for example, by recalculating a sustainability score of the entity (e.g., by rating whether the entity is on track to, predicted to be 10% or closer off track from, or predicted to be more than 10% off track from meeting sustainability targets) based on the added indications.

In some examples, the verification module 102 may receive in-process verification of characteristics of the product during manufacturing. For example, data from one or more sensors positioned and oriented to detect characteristics of the product during manufacturing may be received at the verification module 102, and the verification module 102 may update the blockchain with the data or information representative of the data. The sensors may include image sensors, thermal sensors, acoustic sensors (e.g., ultrasonic sensors), distance sensors, or other sensors known in the art for monitoring a manufacturing process. Data received from the sensors may be representative of, for example, still images of an intermediate product in process of manufacturing the product, video of a complete process of manufacturing the product, density, dimensions, peak temperature (e.g., proximate to application of heat to a precursor material in an additive manufacturing device configured as a selective laser sintering device), or other product characteristics. The verification module 102 may record all the data representative of the product characteristics from the sensors, providing real-time updates to the secure, distributed transaction ledger and associating those updates with the encrypted, secure identifier for the product, in some examples. In other examples, the verification module 102 may compare a completed record of the product characteristics from the sensors to a product specification, including any tolerances, and update the secure, distributed transaction ledger with an indication that product characteristics are within specification or are outside specification.

When manufacturing is verified as being complete, and the record of manufacturing and/or product characteristics is not within specification, the verification module 102 may at least temporarily suspend any further progress toward fulfillment of the order. In some examples, the verification module 102 may send a request for the entity that placed the order to accept or reject the product, given the known deviations from the specification. When receiving acceptance of the product despite the deviations, the manufacturing module 112 and/or an order fulfillment module 114 may proceed toward fulfillment of the order. When receiving rejection of the product because of the deviations, the ordering module 104 may cancel the order or the manufacturing module 112 may coordinate re-manufacturing of the item in accordance with the specification, potentially utilizing a different manufacturing device and/or a different manufacturer altogether. When coordinating re-manufacturing of the product utilizing the same manufacturer, the verification module 102 may provide an indication of the reasons the product was rejected (e.g., a list of product characteristics outside specification, a disclosure of values for the product characteristics as compared to the specification) and optionally recommendations for additional process controls that may be utilized to increase the likelihood that subsequent manufacturing efforts will result in a product within specification.

In some examples, the verification module 102 may compare the deviations from the specification to sets of predefined thresholds to automatically determine whether to accept or reject the product. For example, the ordering module 104 may accept one or more thresholds outside a specification for the product design of the product, within which the customer will accept deviations, and outside which the customer will not accept deviations. When the actual deviations are outside the specification and within the threshold(s), the verification module 102 may automatically record acceptance of the product in the blockchain, consistent with the order, and the manufacturing module 112 may proceed toward fulfillment. When the actual deviations are outside the specification and outside one or more of the threshold(s), the verification module 102 may automatically record rejection of the product in the blockchain, consistent with the order, and the ordering module 104 may cancel the order or the manufacturing module 112 may coordinate re-manufacturing of the product.

In some examples, the manufacturing module 112 may also coordinate any post-processing of the product to be performed in accordance with the product design and/or the order. For example, when the manufacturer has preapproved equipment and capabilities to perform the relevant post-processing (e.g., heat treatment, surface treatment, assembly), the manufacturing module 112 may coordinate post-processing in a manner similar to coordination of manufacturing. More specifically, the manufacturing module 112 may send requests for verification for any precursor materials and post-processor capabilities, the verification module 102 may update the blockchain with received verification, the manufacturing module 112 and verification module 102 may cooperatively send instructions and request/receive verification of operational parameters for post-processing of the product, and the verification module 102 may request/receive, in-process verification of product characteristics during post-processing. The verification module 102 may update the blockchain with all data received or with an indication that the data passed or did not pass comparisons against the specification to associate the verification with the encrypted, secure identifier in the secure, distributed transaction ledger.

In some examples, the verification module 102 may receive data representative of final, post-manufacture (and after post-processing) characteristics of the product. For example, data from one or more sensors positioned and oriented to detect characteristics of the product following completion of all instructions from the manufacturing module 112 may be received at the verification module 102, and the verification module 102 may update the blockchain with the data or information representative of the data. The sensors may include, for example, image sensors, thermal sensors, acoustic sensors (e.g., ultrasonic sensors), distance sensors, or other sensors known in the art for monitoring a manufacturing process. As a specific, nonlimiting example, the product may be scanned by a computed tomography (CT) scanner. Data received from the sensors may be representative of, for example, still images of the final product, CT scanner data, density, dimensions, surface roughness, material composition, or other product characteristics. The verification module 102 may record all the data representative of the final product characteristics from the sensors, providing updates to the secure, distributed transaction ledger and associating those updates with the encrypted, secure identifier for the product, in some examples. In other examples, the verification module 102 may compare a completed record of the product characteristics from the sensors to a product specification, including any tolerances, and update the secure, distributed transaction ledger with an indication that product characteristics are within specification or are outside specification.

In some examples, the verification of data representative of post-manufacture processing of the product may include data regarding the sustainability of processes and materials used when performing post-manufacture processing on the product. For example, the verification module 102 may request or require receipt of indications of the environmental impact of post-processing performed on the product and the sustainability of post-manufacturing processes utilized for post-processing. More specifically, the verification module 102 may request or require receipt of indications of, for example, energy expended in post-processing the product, source of the energy expended in post-processing the product, a measure of green-house gas emissions from energy expended in post-processing the product, identification of any lubricants and/or coolants used when post-processing the product, whether the lubricants and/or coolants used when post-processing the product are reusable, recyclable, and/or biodegradable, or any combination or subcombination of these or other indications of sustainability. Upon receipt, the verification module 102 may update the blockchain to associate received indications of sustainability with the encrypted, secure identifier. In some examples, the verification module 102 may also calculate an impact the verified indications of sustainability have on an entity's target environmental and sustainability goal, such as, for example, by recalculating a sustainability score of the entity (e.g., by rating whether the entity is on track to, predicted to be 10% or closer off track from, or predicted to be more than 10% off track from meeting sustainability targets) based on the added indications. send a communication to a customer when manufacturing and post-processing for a product ordered by the customer are complete and the product has been approved for delivery. In some examples, the order fulfillment module 114 may be configured to track delivery of the product to the customer, such as, for example, by receiving updates on delivery status from a product delivery service provider (e.g., utilizing an APT) and making the updates available to the customer. In some examples, the verification module 102 may be programmed and configured to update the blockchain with information regarding order fulfillment in association with the encrypted, secure identifier.

In some examples, the verification of fulfillment and delivery may include data regarding the sustainability of fulfillment and delivery used when fulfilling the order. For example, the verification module 102 may request or require receipt of indications of the environmental impact of packaging and delivering the product to the customer. More specifically, the verification module 102 may request or require receipt of indications of, for example, materials and material quantities used for packaging the product, whether the materials used to package the product are reusable, recyclable, and/or biodegradable, energy expended in delivering the product, source of the energy expended in delivering the product, a measure of green-house gas emissions from energy expended in delivering the product, or any combination or subcombination of these or other indications of sustainability. Upon receipt, the verification module 102 may update the blockchain to associate received indications of sustainability with the encrypted, secure identifier. In some examples, the verification module 102 may also calculate an impact the verified indications of sustainability have on an entity's target environmental and sustainability goal, such as, for example, by recalculating a sustainability score of the entity (e.g., by rating whether the entity is on track to, predicted to be 10% or closer off track from, or predicted to be more than 10% off track from meeting sustainability targets) based on the added indications.

In some examples, the system 100 may include a use and wear input module 116 programmed and configured to receive data indicative of in-field use and/or post-use wear during the useful life of the product. For example, the use and wear input module 116 may be programmed and configured to receive data regarding usage of the product in the field (e.g., time in the field, operational parameters utilized when using the product, location of use, components and/or systems utilized in connection with the product, entities and/or persons operating the product), such as by receiving the data from a connected customer system utilizing an API, In some examples, a network-connected in-field device (e.g., a control system for controlling operation of the product in the field) may send a record of operational parameters utilized when operating the product to the verification module 102 in real time. The verification module 102 may record all the operational parameters utilized by the in-field device, providing real-time updates to the secure, distributed transaction ledger and associating those updates with the encrypted, secure identifier for the product, in some examples.

As another example, the use and wear input module 116 may be programmed and configured to receive data representative of wear and degradation of the product due to in-field use. Such data may include, for example, changes in dimensions, changes in surface roughness, changes in material composition (particularly at exposed surfaces), or other indicators of wear and degradation of the product. The data may be produced utilizing, for example, one or more sensors positioned and oriented to detect characteristics of the product following completion of an in-field deployment and may be received at the verification module 102. The verification module 102 may update the blockchain with the data or information representative of the data. The sensors may include, for example, image sensors, thermal sensors, acoustic sensors (e.g., ultrasonic sensors), distance sensors, or other sensors known in the art for monitoring a manufacturing process. As a specific, nonlimiting example, the product may be scanned by a computed tomography (CT) scanner. Data received from the sensors may be representative of, for example, still images of the used product, CT scanner data, density, dimensions, surface roughness, material composition, or other product characteristics. The verification module 102 may record all the data representative of the used product characteristics from the sensors, providing updates to the secure, distributed transaction ledger and associating those updates with the encrypted, secure identifier for the product, in some examples.

The system 100 may include a repair and refurbishment module 118 in some examples, the repair and refurbishment module 118 programmed and configured to coordinate and verify any efforts to repair, maintain, and refurbish the product following in-field use. For example, when a record of the use and/or wear of the product approaches, reaches, or exceeds a predefined threshold (e.g., set by a product designer or other rights holder in the product design for the product), the repair and refurbishment module 118 may send a recommendation to a client device of the customer to repair, maintain, refurbish, retire, or otherwise address the use and/or wear on the product (e.g., by backfilling voids, re-performing heat treatment, replacing components). In some examples, the repair and refurbishment module 118 may coordinate repair, maintenance, refurbishment, retirement, or other actions to be taken in connection with the product following use. For example, the repair and refurbishment module 118 may facilitate contact between the owner of the product and the manufacturer or a third-party service provider to ensure that appropriate repair, maintenance, refurbishment, retirement, or other actions to be taken in connection with the product following use is provided.

The verification module 102 may receive verification of any repair, maintenance, refurbishment, retirement, or other actions to be taken in connection with the product following use and may update the blockchain to incorporate the verification in a manner linked to the encrypted, secure identifier to track the lifecycle of the product. For example, data verifying repair, maintenance, and/or refurbishment may be produced utilizing, for example, one or more sensors positioned and oriented to detect characteristics of the product during and/or following completion of such repair, maintenance, and/or refurbishment and may be received at the verification module 102. The verification module 102 may update the blockchain with the data or information representative of the data. The sensors may include, for example, image sensors, thermal sensors, acoustic sensors (e.g., ultrasonic sensors), distance sensors, or other sensors known in the art for monitoring a repair, maintenance, and/or refurbishment process. As a specific, nonlimiting example, the product may be scanned (or re-scanned) by a computed tomography (CT) scanner. Data received from the sensors may be representative of, for example, still images of the used product, CT scanner data, density, dimensions, surface roughness, material composition, or other product characteristics. The verification module 102 may record all the data representative of the repaired, maintained, and/or refurbished product characteristics from the sensors, providing updates to the secure, distributed transaction ledger and associating those updates with the encrypted, secure identifier for the product, in some examples. Retirement of the product may be validated by receiving an indication from the owner or other possessor that they no longer intend to use the product, and the verification module 102 updating the blockchain to show that the lifecycle of the product is complete by associating the indication of retirement with the encrypted, secure identifier in the secure, distributed transaction ledger.

When a product is retired, the system 100 may facilitate reordering a replacement. For example, upon receipt of an indication that the product has been retired, the digital inventory module 106 may search the digital inventory to determine whether the same product or an updated version of the product is available. The ordering module 104 may send a request for confirmation regarding a potential reorder of the product or updated version of the product to the owner or other possessor of the retired product. Alternatively, the ordering module 104 may automatically reorder the product or an updated version of the product, send confirmation of the reorder to the owner or other possessor of the retired product, and proceed toward fulfillment.

In some examples, users of the system 100 may be subjected to a prequalification process before being authorized to access and utilize one or more modules of the system 100. For example, an entity may confirm with an administrator of the system the functionality of the system 100 the entity anticipates using, the entity's identity and authorization of those persons and devices operating with the system 100 to act on behalf of the entity, the entity's willingness to comply with any requirements of the system 100 (e.g., connectivity, maintenance of security, commitment to supply reliable information, ongoing participation), the entity's capabilities (e.g., licensing and certification of users, operators, and/or technicians, machinery owned, client devices and controls therefor, databases and controls therefor), or any combination or subcombination of these or other prequalification metrics. In some examples, authorization for a new entity to participate in the system 100 may require consensus among at least some of the existing participants in the system. In other examples, new entities may be prequalified so long as they meet prerequisite standards established within the system 100, or in response to unilateral administrator approval.

Upon prequalification, an entity may be registered within the system 100, any requisite public or private keys to encrypt data to be received by the system 100 may be sent to the entity, any requisite private keys to decrypt data sent from the system 100 may be sent to the entity, software to enable authorized client devices of the entity to interface with the system 100 may be sent for installation, and any other actions to facilitate entity participation in the system 100 may be undertaken. For example, information confirming rights to a product design, information sufficient for a potential purchaser to identify the product design when ordering, and information sufficient to manufacture the product design, or any combination or subcombination of these and any other requested or required information relevant to a product design, its designer, or its current owner may be received from a designer or other tights holder in a product design. The verification module 102 and the digital inventory module 106 may cooperatively receive and store the product design in a designated database, such as a blockchain dedicated to product designs or a blockchain dedicated to product designs by the designer or other rights holder, with access restrictions put in place as discussed previously herein.

As another example, a listing of manufacturing devices in service, identification of how the manufacturing devices are operated (e.g., manual, computer controlled, fully automatic, integrated system) and whether the manufacturing devices are network-connectable, information confirming licensing and certifications for operators of the manufacturing devices, or any combination or subcombination of these and any other requested or required information relevant to a manufacturer and its capabilities may be received from a designer or other rights holder in a product design. If adequate control and security software is not currently deployed across the manufacturer's devices, The verification module 102 and the digital inventory module 106 may cooperatively receive and store the manufacturer capabilities, and confirmation of installation of control and security software, in a designated database, such as a blockchain dedicated to coordinating manufacturers for given orders or a blockchain dedicated to a specific manufacturer, with access restrictions put in place as discussed previously herein.

Other entities that may be prequalified for participation in the system may include, for example, customers, suppliers of precursor materials and/or components, post-processors (e.g., providers of surface treatments, heat treatments, assembly, system integration), delivery service providers, in-field operators, providers of post-use services (e.g., repair, maintenance, refurbishment), providers of post-retirement services (e.g., recyclers, component salvagers, material reprocessors, providers of disposal services), auditors, regulators, or any combination or sub combination of these or other entities involved in the design, manufacture, delivery, and use of a product.

In some examples, systems 100 in accordance with this disclosure may facilitate secure, reliable manufacturing of products with a verified record of relevant data for the product from order, through manufacturing and fulfillment, and optionally throughout an entire lifecycle of the product. For example, the manufacturing module 112 of the system 100 may be configured to facilitate manufacturing by a decentralized network of manufacturers, enabling concurrent mass production of at least substantially identical products by different entities. Such a decentralized approach may reduce the need to deploy manufacturing equipment and personnel at scale to achieve mass production or concurrent production of multiple units. The verification module 102 of the system 100 may reduce the risk that such a decentralized approach may negatively affect quality and/or consistency among products manufactured utilizing the system 100.

Though many industries may deploy and benefit from systems 100 in accordance with this disclosure, one industry that may deploy and benefit from systems 100 as disclosed herein may include oil and gas exploration. For example, earth-boring tools, cutting elements for earth-boring tools, and equipment and accessories for use with earth-boring tools may benefit from specialized materials and manufacturing processes. Rather than rely on vertical integration, with a single entity providing personnel, materials, and equipment for manufacturing earth-boring tools and related equipment, systems 100 enabling distributed manufacturing may enable customers to access specialized knowledge and capabilities without compromising security, quality, or consistency. Other industries may likewise benefit from systems 100 in accordance with this disclosure, such as, for examples, the automotive, aerospace, power generation, industrial equipment, construction equipment, defense, and other industries having specialized manufacturing needs and high barriers to deployment.

Figure 2:
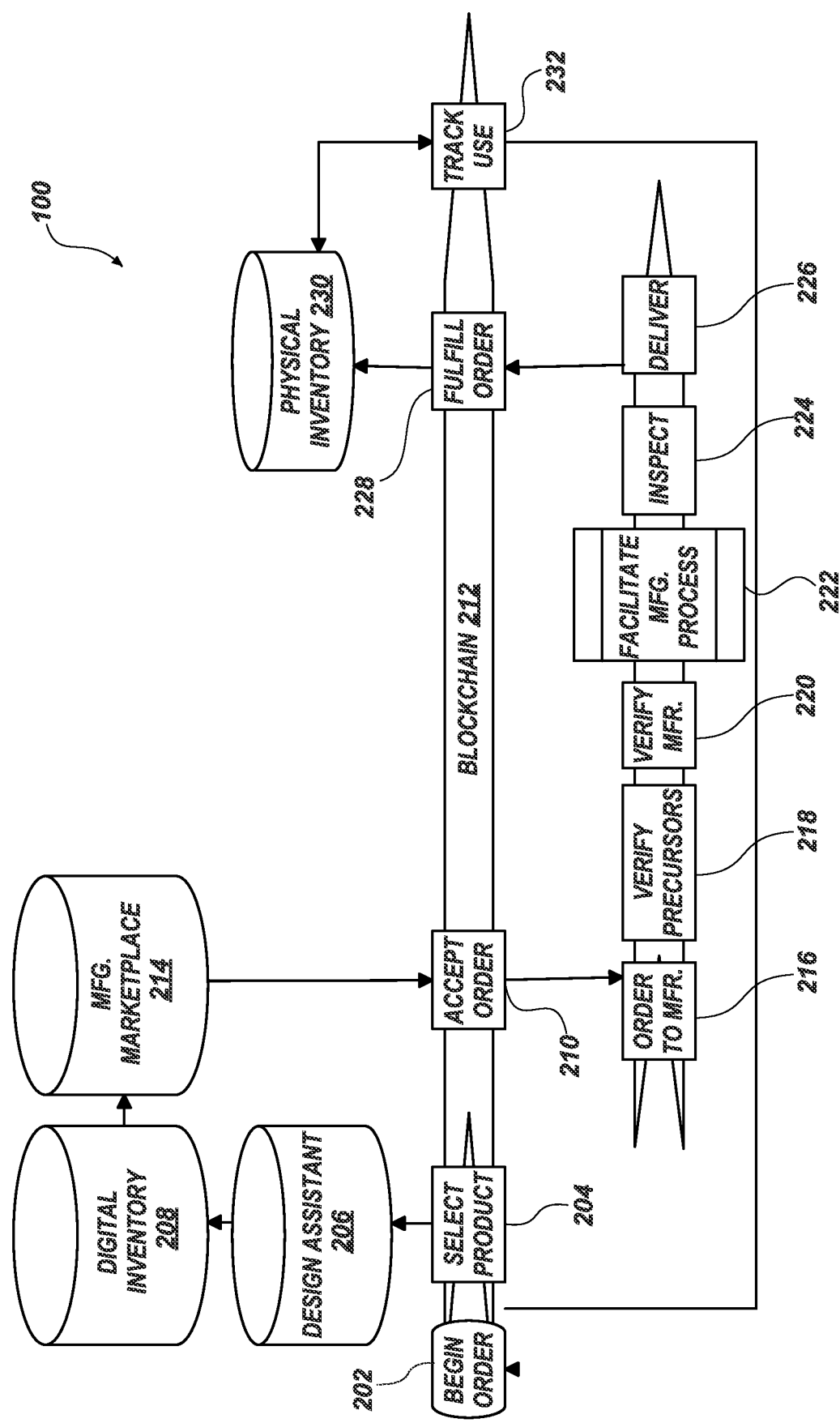
FIG. 2 is a schematic view of workflow processes for a product to be verified by the system of FIG. 1.

FIG. 2 is a schematic view of illustrative workflow processes for a product to be verified by the system 100 of FIG. 1. For example, the workflows may start when the system 100 receives a request for order initiation 202 from a client device, such as from a customer or other purchaser of a product through the system 100. At order initiation 202, the system 100 may send identifications of product designs available through the system 100 to enable a user to select an appropriate product design for manufacture. The system 100 may also receive from the user information to assist in presenting product designs likely to meet the user's needs, such as, for example, by receiving expected use information and/or receiving identification of any existing products to be replaced.

The system 100 may proceed toward a product selection process 204. For example, the system 100 may utilize an assisted design module 206 (e.g., with artificial intelligence and/or machine learning) to recommend product designs that may have best predicted performance in the received expected uses. When performing order initiation 202 and product selection process 204, the system 100 may access at least some portions of a digital inventory 208 storing the product designs. For example, the system 100 may utilize one or more private keys available only to the system 100 to access and decrypt encrypted data representative of the product designs in the digital inventory 208. When providing data from the digital inventory 208 to a client device to facilitate a product selection process 204, the system 100 may limit the data provided to information sufficient to identify a given product design (e.g., product name, external images of product) and information preapproved by a designer or other rights holder in the product design for public disclosure (e.g., marketing information).

Following order acceptance 210, and optionally during order initiation 202 and the product selection process 204, the system 100 may update a blockchain 212 to include a record of the order. For example, the system 100 may generate an encrypted, secure identifier for the product to be manufactured (e.g., a hash), and may store encrypted data representative of the product design in the blockchain in a manner associating the data with the encrypted, secure identifier. In some examples, the digital inventory 208 may likewise be maintained on a blockchain 212, such as, for example, a separate blockchain from the blockchain 212 for verifying the product.

Upon order acceptance 210 the system 100 may coordinate manufacturing of the product design, such as, for example, by sending requests for availability to a manufacturing marketplace 214 maintained within the system 100. For example, the system 100 may contact the manufacturer or manufacturers preferred or required within the order to verify the relevant entity or entity's availability and capability to manufacture the product in accordance with the order. As another example, the system 100 may send information sufficient to identify the product to be manufactured to the manufacturing marketplace 214 with a request for manufacturers to confirm availability, capabilities, and other willingness to comply with terms of the order. The system 100 may automatically coordinate manufacturing among the manufacturers or may send suitable respondents to a client device for a customer to approve the manufacturer(s) to manufacture the product (e.g., with ratings from prior manufacturing jobs to rank potential manufacturers).

Once manufacturing has been coordinated via the manufacturing marketplace 214, the system 100 may transmit confirmation of the order to each approved manufacturer 216. The confirmation of the order may include sufficient information to identify the product to be manufactured, information regarding any precursors that will be required to begin manufacturing, and a request for verification of any manufacturer capabilities required before manufacturing can proceed. Following order acceptance 210, each communication between the system 100 and each manufacturer relevant to the product may be verified and stored in the blockchain 212. For example, all data sent in connection with transmission of the order confirmation may be stored in the blockchain 212 in association with the encrypted, secure identifier.

Before proceeding to manufacture, the system 100 may require receipt of verification of precursor materials and/or components 218 from a client device of the manufacturer. For example, the system 100 may require receipt of images and/or digital records of the source and composition of materials to be utilized during manufacturing. The system 100 may also require receipt of images and/or digital records of the source and identification of any premade components to be used when manufacturing and/or assembling the product. Each communication from the manufacturer may be authenticated, for example, by the manufacturer's use of a private key put in place during prequalification of the manufacturer to participate in the system 100. The system 100 may update the blockchain 212 with the data received for verification of precursor materials and/or components 218. In some examples, the system 100 may automatically verify the data received against terms of the order to authorize further progress toward fulfilment, or may send the data received to a client device of the customer to approve progress within the system 100.

The system 100 may also require receipt of verification of manufacturer capabilities 220 from a client device of the manufacturer. For example, the system 100 may require receipt of images and/or digital records of the identity and calibration of manufacturing devices to be utilized during manufacturing. The system 100 may also require receipt of images and/or digital records of certifications and/or licensing of any equipment operators of any manufacturing devices to be used when manufacturing the product. Each communication from the manufacturer may be authenticated, for example, by the manufacturer's use of a private key put in place during prequalification of the manufacturer to participate in the system 100. The system 100 may update the blockchain 212 with the data received for verification of manufacturer capabilities 220. In some examples, the system 100 may automatically verify the data received against terms of the order to authorize further progress toward fulfilment, or may send the data received to a client device of the customer to approve progress within the system 100.

Following verification of precursor materials and/or components 218 and verification of manufacturer capabilities 220, the system 100 may proceed toward coordination and verification of the manufacturing and post-processing process 222. In some examples, the system 100 may decrypt data from the product design in the digital inventory 208 representative of instructions for manufacturing the product utilizing a private key accessible to the system 100, may prepare instructions configured to enable an automatic manufacturing device (e.g., an additive manufacturing device, a computer numerical control (CNC) manufacturing device) to manufacture the product utilizing the precursors, and may encrypt and send discrete packets of the instructions to a connected client device. The client device may decrypt the packets of instructions, execute the instructions to manufacture the product, and send confirmation of deletion of the packets of instructions upon completion of each respective packet. In other examples, the system 100 may decrypt data from the product design in the digital inventory 208 representative of instructions for manufacturing the product utilizing a private key accessible to the system 100, may prepare instructions configured to enable an operator of a manually controlled manufacturing device to manufacture the product utilizing the precursors, and may encrypt and send the instructions to a connected client device. The instructions may be decryptable by the client device, may contain embedded access restrictions to permit display of the instructions to manufacture the product, may contain embedded access restrictions to prohibit and send attempts to copy, transmit, or otherwise grant unauthorized access to or use of the instructions to the system 100, and may contain embedded access restrictions to require confirmation of deletion of the instructions upon confirmation of completion from the client device.

The system 100 may also require receipt of verification of the manufacturing and post-processing process 222 from one or more client devices of the manufacturer. For example, the system 100 may require receipt of sensor data generated by sensors oriented toward the product, manufacturing device, and/or operator during manufacturing. More specifically, the system 100 may require receipt of periodically captured images, a live video feed, real-time thermal imaging at a site of manufacturing on the product, real-time density data of the product during manufacture, real-time measurements of product dimensions, or any combination or subcombination of these and other data indicative of the process utilized to manufacture the product and/or the in-manufacture characteristics of the product, Each communication from the manufacturer may be authenticated, for example, by the manufacturer's use of a private key put in place during prequalification of the manufacturer to participate in the system 100. The system 100 may update the blockchain 212 with the data or with an indication representative of the data received for verification of the manufacturing and post-processing process 222. In some examples, the system 100 may automatically verify the data received against terms of the order to authorize further progress toward fulfilment, or may send the data received to a client device of the customer to approve progress within the system 100.

In some examples, the system 100 may decrypt data from the product design in the digital inventory 208 representative of instructions for post-processing the product utilizing a private key accessible to the system 100, may prepare instructions configured to enable an automatic post-processing device (e.g., a computer-controlled heat treatment device, a computer-controlled surface treatment device) to process the product, and may encrypt and send discrete packets of the instructions to a connected client device upon receiving confirmation that the product is available and ready for post-processing. The client device may decrypt the packets of instructions, execute the instructions to process the product, and send confirmation of deletion of the packets of instructions upon completion of each respective packet. In other examples, the system 100 may decrypt data from the product design in the digital inventory 208 representative of instructions for processing the product utilizing a private key accessible to the system 100, may prepare instructions configured to enable an operator of a manually controlled post-processing device to process the product, and may encrypt and send the instructions to a connected client device. The instructions may be decryptable by the client device, may contain embedded access restrictions to permit display of the instructions to process the product, may contain embedded access restrictions to prohibit and send attempts to copy, transmit, or otherwise grant unauthorized access to or use of the instructions to the system 100, and may contain embedded access restrictions to require confirmation of deletion of the instructions upon confirmation of completion from the client device.

The system 100 may also require receipt of verification of the manufacturing and post-processing process 222 from one or more client devices of the post-processor. For example, the system 100 may require receipt of sensor data generated by sensors oriented toward the product, post-processing device, and/or operator during post-processing. More specifically, the system 100 may require receipt of periodically captured images, a live video feed, real-time thermal imaging at a site of post-processing on, or an entirety of, the product, real-time density data of the product during post-processing, real-time measurements of product dimensions, or any combination or subcombination of these and other data indicative of the process utilized to process the product and/or the in-process characteristics of the product. Each communication from the post-processor may be authenticated, for example, by the post-processor's use of a private key put in place during prequalification of the post-processor to participate in the system 100. The system 100 may update the blockchain 212 with the data or with an indication representative of the data received for verification of the manufacturing and post-processing process 222. In some examples, the system 100 may automatically verify the data received against terms of the order to authorize further progress toward fulfilment, or may send the data received to a client device of the customer to approve progress within the system 100.

The system 100 may also be configured to accept verification of inspection processes 224 and final product characteristics. For example, the system 100 may decrypt data from the product design in the digital inventory 208 representative of product characteristics to be verified upon completion of manufacturing and post-processing the product utilizing a private key accessible to the system 100, may prepare instructions configured to enable an automatic inspection device (e.g., a CT scanner) to inspect the product, and may encrypt and send discrete packets of the instructions to a connected client device upon receiving confirmation that the product is available and ready for final inspection. The client device may decrypt the packets of instructions, execute the instructions to inspect the product, and send confirmation of deletion of the packets of instructions upon completion of each respective packet. In other examples, the system 100 may decrypt data from the product design in the digital inventory 208 representative of instructions for inspecting the product utilizing a private key accessible to the system 100, may prepare instructions configured to enable an operator of a manually controlled inspection device or manually operated inspection tools (e.g., calipers for measuring dimensions) to inspect the product, and may encrypt and send the instructions to a connected client device. The instructions may be decryptable by the client device, may contain embedded access restrictions to permit display of the instructions to inspect the product, may contain embedded access restrictions to prohibit and send attempts to copy, transmit, or otherwise grant unauthorized access to or use of the instructions to the system 100, and may contain embedded access restrictions to require confirmation of deletion of the instructions upon confirmation of completion from the client device.

The system 100 may also require receipt of the verification of inspection processes 224 and results from one or more client devices of the inspector. For example, the system 100 may require receipt of sensor data generated by sensors oriented toward the product, inspection device, and/or inspector during post-processing. More specifically, the system 100 may require receipt of periodically captured images, a live video feed, real-time or post-scan imaging of the product and its interior structure and material composition from a scanner (e.g., a CT scanner), real-time or post-detection measurements of product dimensions, or any combination or subcombination of these and other data indicative of the process utilized to inspect the product and/or the final characteristics of the product. Each communication from the inspector may be authenticated, for example, by the inspector's use of a private key put in place during prequalification of the inspector to participate in the system 100. The system 100 may update the blockchain 212 with the data or with an indication representative of the data received for verification of inspection processes 224 and results. In some examples, the system 100 may automatically verify the data received against terms of the order to authorize further progress toward fulfillment, or may send the data received to a client device of the customer to approve progress within the system 100.

In some examples, the system 100 may be configured to coordinate delivery logistics 226 for the product. For example, upon acceptance of the product following manufacturing, post-processing, and inspection, the system 100 may send a request to a delivery service provider to provide a quote for delivery costs or to pick up the product from the inspector or another temporary possessor of the product for delivery.

The system 100 may be configured to receive confirmation of order fulfillment 228. For example, verification of order fulfillment 228 may be received from a delivery service provider upon delivery of the product or from a customer upon receipt of the product. When order fulfillment 228 has been verified, the system 100 may verify and encrypt the record of manufacturing of the product in the blockchain 212. For example, the data received, or data representative of the data received, from order initiation 202 through order fulfillment 228 may be encrypted and uploaded to the blockchain 212 in a manner associating the data with the encrypted, secure identifier. The record may be immutable, or may only be changeable with consensus from relevant participants in the system 100, ensuring that the data is available and reliable for interested parties, such as, for example, the customer, auditors, and regulators.

In some examples, a physical inventory manager 230 may be updated to reflect delivery and ownership of the product upon order fulfillment 228. The physical inventory manager 230 may enable the system 100 to track inventory and stock, and may enable the system 100 to facilitate reordering or replacement of the product responsive to trends and/or status of the physical inventory reflected in the physical inventory manager 230.

In some examples, the system 100 may be configured to receive verification of usage and wear 232 resulting from in-field use of the product. For example, the system 100 may be configured to receive data representative of the location, system into which the product is integrated, operational parameters used in-field, data representative of product performance in the field, data representative of measurements of product dimensions due to in-field wear, or any combination or subcombination of these and other data indicative of the usage and wear of the product and/or the final characteristics of the product. Each communication from the owner or operator may be authenticated, for example, by the owner or operator's use of a private key put in place during prequalification of the owner or operator to participate in the system 100. The system 100 may update the blockchain 212 with the data or with an indication representative of the data received for verification of usage and wear 232. The verification of usage and wear 232 may enable the system 100 to track product performance and suitability for use, and may enable the system 100 to facilitate reordering or replacement of the product responsive to trends and/or status of the product's characteristics and performance. In some examples, the system 100 may be configured to receive and store in the blockchain 212 data representative of repair, refurbishment, and maintenance of the product, in a manner similar to the verification of usage and wear 232.

Figure 3:
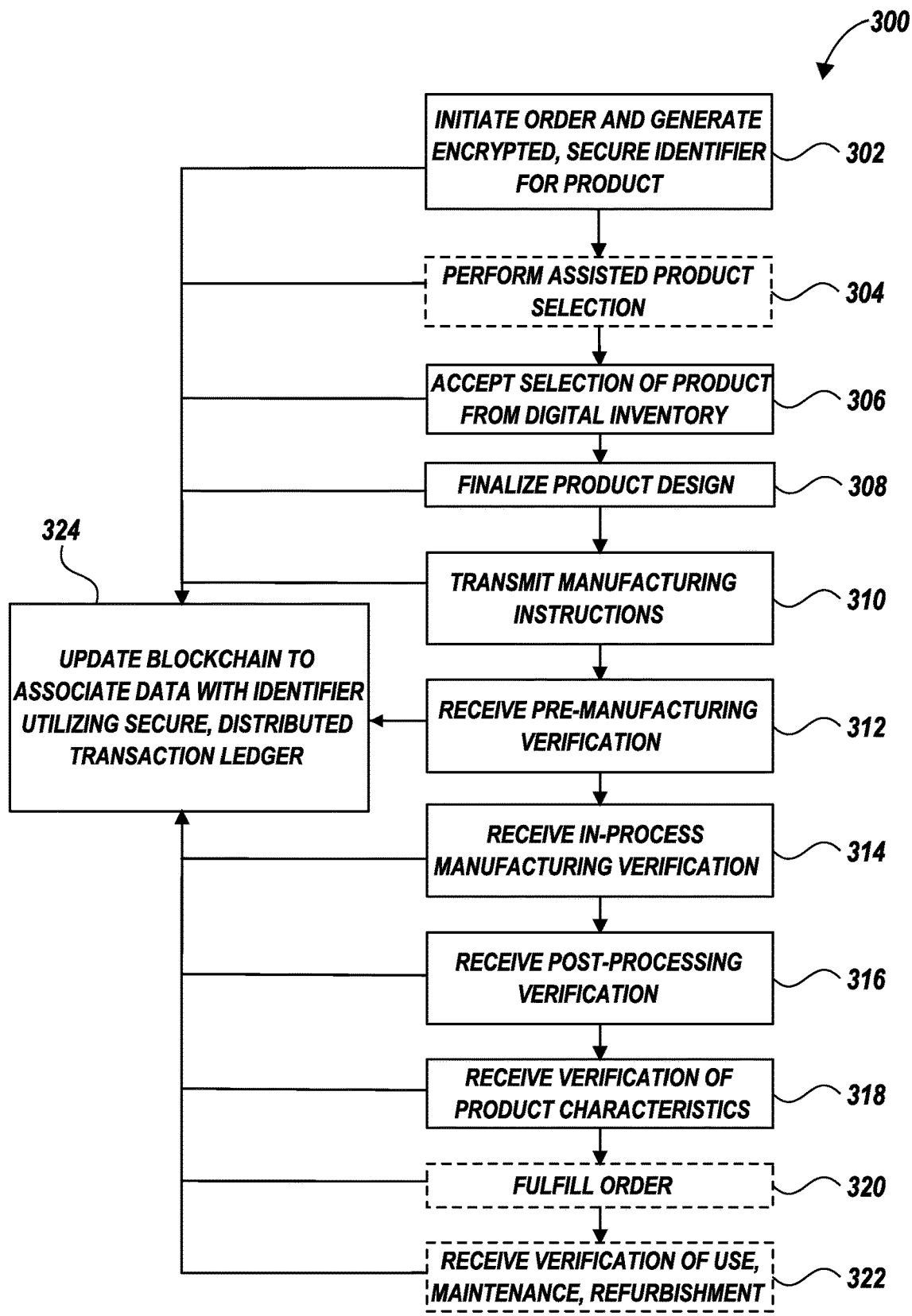
FIG. 3 is a flowchart of a method of providing end-to-end verification of workflow processes for a product.

FIG. 3 is a flowchart of a method 300 of providing end-to-end verification of workflow processes for a product. The method 300 may involve, for example, initiating an order and generating an encrypted, secure identifier for the product, as indicated at act 302. More specifically, a request from a client device may be received to initiate an order, and information to assist in selecting an appropriate product may be requested. In some examples, requests for the information may be sent to the client device, such as, for example, utilizing a webform. In some examples, the encrypted, secure identifier may be generated upon order initiation, enabling tracking of the ordering process. In other examples, the encrypted, secure identifier may be generated after an order is confirmed, as set forth below.

In some examples, the method 300 may involve performing assisted product selection, as indicated at act 304. For example, a digital inventory of available product designs may be searched, and product designs having best recorded performance in use cases closest to expected uses received from a client device may be recommended. In some examples, the method 300 may also involve performing assisted product design. For example, a designer or other rights holder in a product design may enable alterations to be made a product design in the digital inventory within pre-approved limits (e.g., changes to size, shape, dimensions, alternative materials, alternative manufacturing processes). As another example, potential alterations to a product design may be recommended by the system by analyzing performance of the product against features of other, similar products enabling improved performance.

The method 300 may involve accepting selection of a product from the digital inventory, as indicated at act 306, and finalizing the product design to be manufactured, as indicated at act 308. Upon finalization of the product design to be manufactured, a digital twin of the product, including the product design, may be created and a blockchain may be updated to associate data, such as the product design and digital twin, with the encrypted, secure identifier utilizing a secure, distributed transaction ledger, as indicated at act 324.

The method 300 may proceed to begin transmitting manufacturing instructions for manufacturing the product to a manufacturer, as indicated at act 310. For example, information sufficient to identify the product and to enable the manufacturer to obtain any necessary precursors and equipment may be transmitted. The method 300 may involve receiving pre-manufacturing verification of requested and/or required information, such as, for example, precursor availability and manufacturer capabilities, as indicated at act 312. Upon receipt of the pre-manufacturing verification, the blockchain may be updated to associate the pre-manufacturing verification with the encrypted, secure identifier utilizing a secure, distributed transaction ledger, as indicated at act 324.

The method 300 may proceed to receive in-process manufacturing verification, as indicated at act 314. For example, operational parameters used and resulting product characteristics produced during manufacturing may be received. Upon receipt of the in-process manufacturing verification, the blockchain may be updated to associate the in-process manufacturing verification with the encrypted, secure identifier utilizing a secure, distributed transaction ledger, as indicated at act 324.

The method 300 may proceed to receive verification of post-processing performed on the product, as indicated at act 316. For example, operational parameters used and resulting product characteristics produced during post-processing may be received. Upon receipt of the post-processing verification, the blockchain may be updated to associate the post-processing verification with the encrypted, secure identifier utilizing a secure, distributed transaction ledger, as indicated at act 324.

The method 300 may proceed to receive verification of product characteristics, as indicated at act 318. For example, data representative of final product characteristics resulting from manufacturing and post-processing may be received. Upon receipt of the verification of product characteristics, the blockchain may be updated to associate the verification of product characteristics with the encrypted, secure identifier utilizing a secure, distributed transaction ledger, as indicated at act 324.

In some examples, the method 300 may involve fulfilling the order, as indicated at act 320. For example, the product meeting the requirements of the product design selected when finalizing the product design at act 308 may be shipped and delivered to the purchaser. In some examples, the method 300 may involve receiving verification of use, maintenance, refurbishment, and other post-manufacture data (e.g., repair, retirement), as indicated at act 322.

Figure 4:
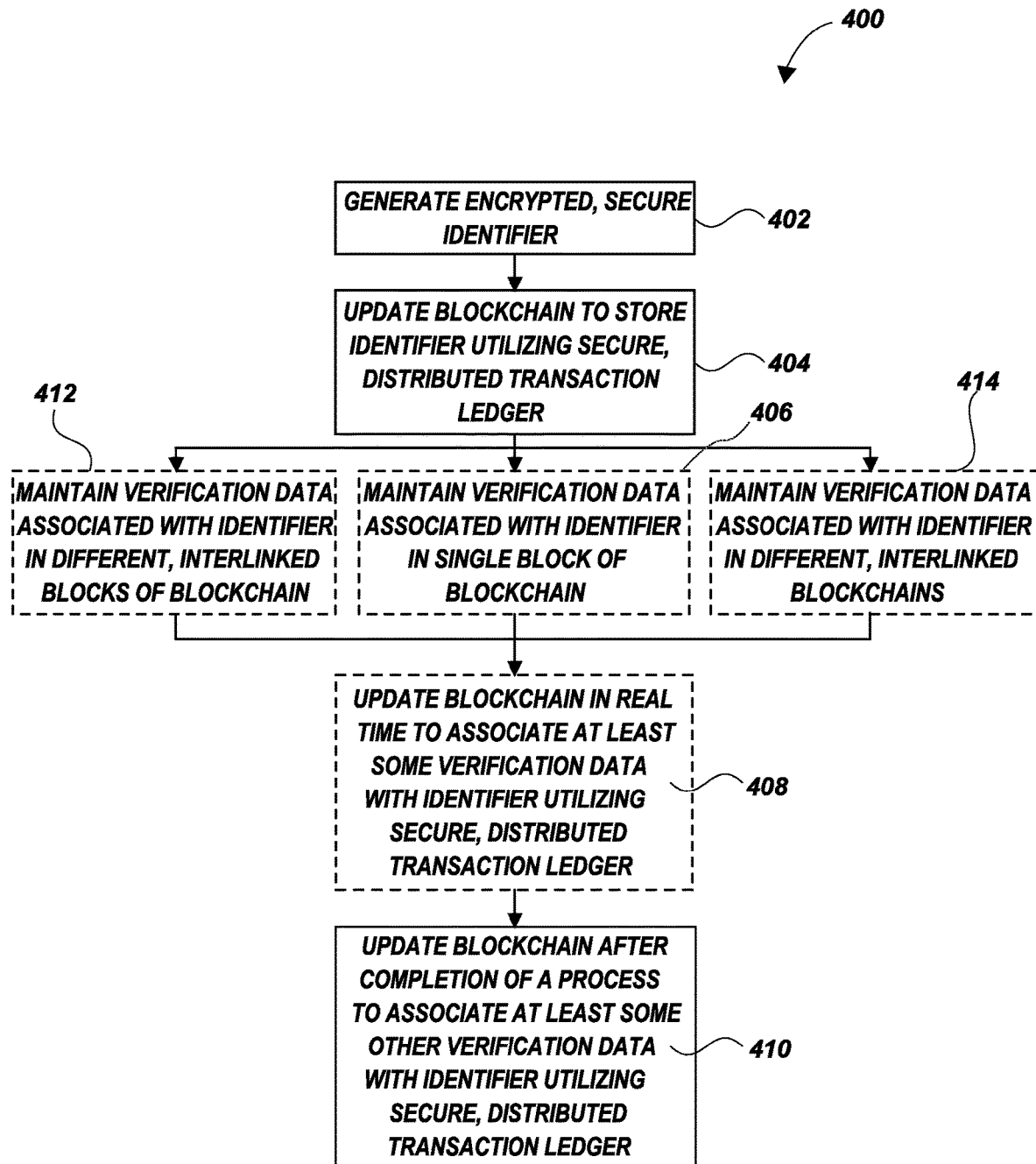
FIG. 4 is a flowchart of another method of providing end-to-end verification of workflow processes for a product.

FIG. 4 is a flowchart of another method 400 of providing end-to-end verification of workflow processes for a product. The method 400 may involve, for example, generating an encrypted, secure identifier, as indicated at act 402, the encrypted, secure identifier configured to collect and associate the verification received in a secure, reliable database. For example, the method 400 may involve generating a hash or token for use in a blockchain to serve as the encrypted, secure identifier.

Following or concurrent with generation, the method 400 may involve updating a blockchain to store the encrypted, secure identifier utilizing a secure, distributed transaction ledger, as indicated at act 404. For example, a block for storing the workflow verification may be created and linked to a previous block in the blockchain utilizing the encrypted, secure identifier.

In some examples, the method 400 may involve maintaining verification data representative of the workflow processes in association with the encrypted, secure identifier in different, interlinked blocks of the blockchain, as indicated at act 412. In other examples, the method 400 may involve maintaining verification data representative of the workflow processes in association with the encrypted, secure identifier in a single, dedicated block of the blockchain, as indicated at act 406. In other examples, the method 400 may involve maintaining verification data representative of the workflow processes in association with the encrypted, secure identifier in a different, interlinked blockchains, as indicated at act 414.

In some examples, the method 400 may involve updating the blockchain in real time to associate at least some verification data with the encrypted, secure identifier utilizing the secure, distributed transaction ledger, as indicated at act 408. For example, the blockchain may be updated within 1 minute, 1 second, 10 cycles, or 1 cycle of receipt of the verification data to provide real-time updates of workflow verification in the blockchain.

In some examples, the method 400 may involve updating the blockchain after completion of a process to associate at least some verification data with the encrypted, secure identifier utilizing the secure, distributed transaction ledger, as indicated at act 410. For example, the verification data may be collected in real time, compared to terms, and the blockchain updated with the results of the comparison. As another example, the verification data may be collected in real time and the blockchain may be updated to include the verification data only after all the verification data has been received. As yet another example, the verification data may only be received after all the verification data has been generated, and the blockchain may be updated to include the verification data or an indication representative of the verification data.

In some examples, the blockchain may be updated with certain of the verification data in real time and a remainder of the verification data upon receipt of the relevant portion of the remainder of the verification data. In other examples, updates to the blockchain may consistently be made in real time or upon receipt of a complete portion of the verification data.

Figure 5:
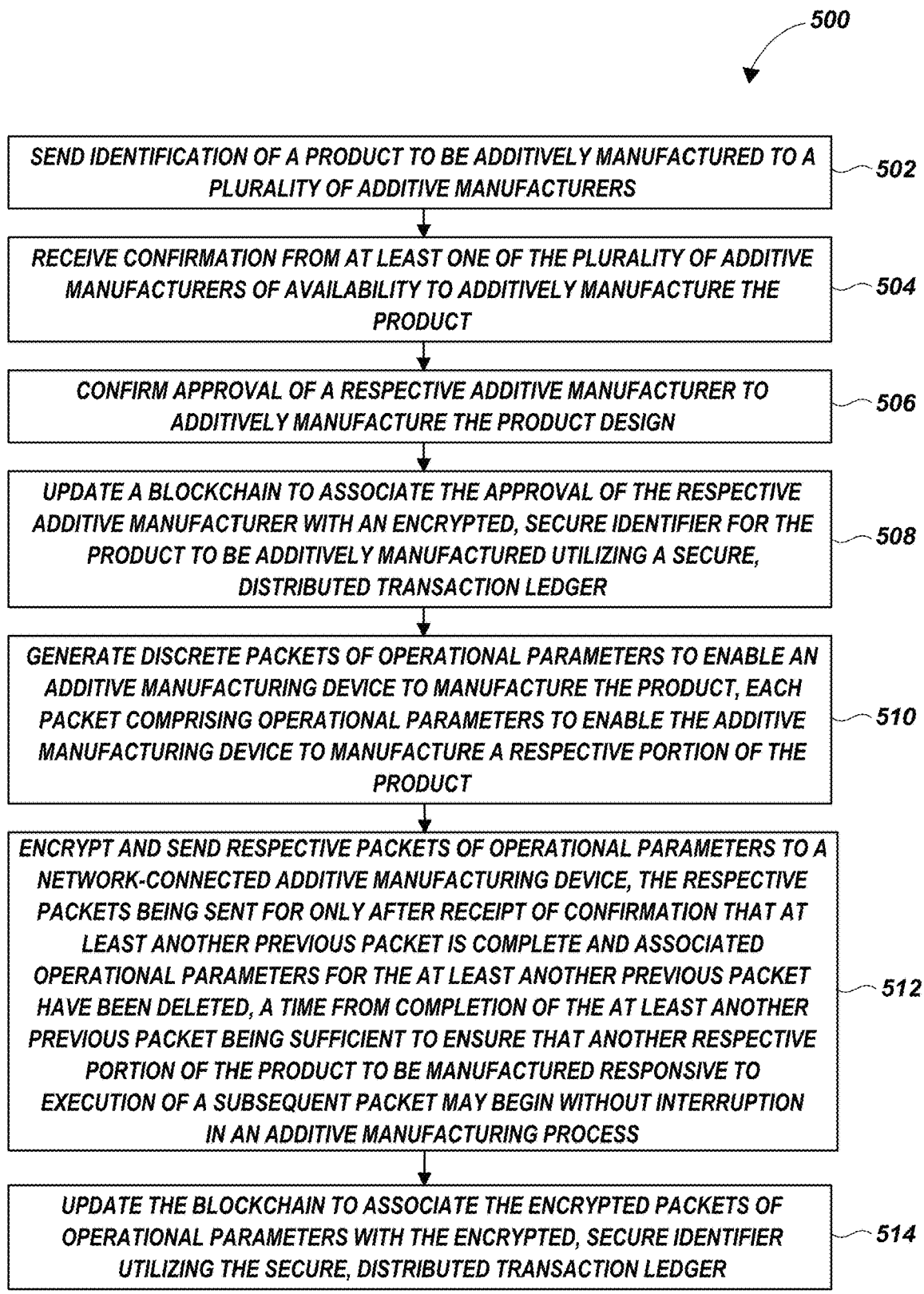
FIG. 5 is a flowchart of another method of providing end-to-end verification of workflow processes for a product.

FIG. 5 is a flowchart of another method 500 of providing end-to-end verification of workflow processes for a product. The method 500 may involve, for example, sending identification of a product to be additively manufactured to a plurality of additive manufacturers, as indicated at act 502. For example, a system may send, for example, a product name, required precursors, and required machinery and manufacturing processes to a marketplace of manufacturers. More specifically, the system may send the identification of the product to, for example, a filtered subset of manufacturers prequalified to participate in the system, the filtered subset having preconfirmed access to the required machinery and preconfirmed capability in the required manufacturing processes. As a specific, nonlimiting example, the system may send the identification of the product to a further filtered subset of manufacturers having preapproval from the customer to manufacture products on behalf of the customer.

The method 500 may also involve receiving confirmation from at least one of the plurality of additive manufacturers of availability to additively manufacture the product, as indicated at act 504. For example, the system may receive from a client device of one or more manufacturers that the respective manufacturer has or can timely acquire required precursors and required machinery for manufacturing the product, as well as qualified personnel to carry out required manufacturing processes for manufacturing the product. In some examples, the system may receive a bid from the client device in connection with the confirmation of availability to additively manufacture the product. More specifically, the system may receive an indication of estimated costs and estimated completion timeline for manufacturing the product from the respective manufacturer. In some examples, the system may receive the verification of availability concurrently when accepting the verification of capability and approval to manufacture the product.

In some examples, the method 500 may involve accepting from the respective additive manufacturer another encrypted, secure identifier when receiving the confirmation from the at least one of the plurality of additive manufacturers of availability to additively manufacture the product. The other encrypted, secure identifier may be indicative of a preexisting verification of capability and approval of the respective additive manufacturer to additively manufacture the product to be additively manufactured. For example, a client device of the manufacturer may transmit confirmation of availability encrypted utilizing a private key received by the manufacturer when prequalifying and verifying the capability and approval of the manufacturer to participate in the system. More specifically, the system may accept from the respective additive manufacturer the other encrypted, secure identifier indicative of, for example, a preexisting verification of capabilities comprising additive manufacturing device model, additive manufacturing device calibration, certification of additive manufacturing device operator, intellectual property ownership of a product design for the product to be additively manufactured, intellectual property license to additively manufacture the product to be additively manufactured, or a combination of these capabilities.

In some examples, the method 500 may involve, for example, accepting pre-manufacture verification of manufacturer capabilities and product precursors for the product to be additively manufactured. For example, a server hosting a system for providing verification of product workflows may prompt a client device of an additive manufacturer to send the verification of manufacturer capabilities and product precursors, and may not proceed toward additively manufacturing the product until after receipt of the verification of manufacturer capabilities and product precursors. More specifically, the system may accept the pre-manufacture verification of the manufacturer capabilities by receiving images of quality required documentation (e.g., operator licensing/certification, machine identity, machine calibration). As another more specific example, the system may accept the pre-manufacture verification of the precursors for manufacturing the product by receiving images of the materials and components to be used to additively manufacture the product or digital specification sheets for the sourcing, material composition, and identification of the materials and components to be used to additively manufacture the product. As a specific, nonlimiting example, acceptance of the pre-manufacture verification of the product precursors may be accomplished by accepting pre-manufacture verification of material composition, particle size distribution, density, morphology, flow properties, or any combination of these properties of the product precursors. Following receipt of the pre-manufacture verification of manufacturer capabilities and product precursors, the method 500 may involve updating the blockchain to associate the pre-manufacture verification of manufacturer capabilities and product precursors with an encrypted, secure identifier for the product to be manufactured utilizing a secure, distributed transaction ledger.

The method 500 may further involve confirming approval of a respective additive manufacturer to additively manufacture the product design, as indicated at act 506. For example, the system may automatically select one or more respective additive manufacturers from within the available manufacturers. More specifically, the system may compare the list of available manufacturers to a list of preapproved manufacturers in an order or from a customer and select an additive manufacturer or set of additive manufacturers having confirmed availability and preapproval from the customer. As a specific, nonlimiting example, the system may automatically confirm approval of a respective additive manufacturer or additive manufacturers when the manufacturer has confirmed availability, is on a list of preapproved manufacturers, and based on an evaluation of a bid from the manufacturer (e.g., closest to median cost and timeline, lowest cost and timeline). As another example, the system may receive approval of the respective additive manufacturer from a client device of the customer. More specifically, the system may send a list of available manufacturers and any associated bids to a client device of the customer along with a request for approval and accept a selection of each approved manufacturer from the client device. The method 500 may involve updating a blockchain to associate the approval of the respective additive manufacturer with an encrypted, secure identifier for the product to be additively manufactured utilizing a secure, distributed transaction ledger, as indicated at act 508.

The method 500 may involve generating discrete packets of operational parameters to enable an additive manufacturing device to manufacture the product, as indicated at act 510. For example, each packet may include operational parameters to enable the additive manufacturing device to manufacture a respective portion of the product, as also indicated at act 510. More specifically, the method 500 may involve remotely controlling an additive manufacturing process and machine utilizing instructions generated at a remote server from a product file only accessible in whole utilizing the remote server. In some examples, the network-connected additive manufacturing device may be configured a selective laser sintering 3D printing device, and the discrete packets of operational parameters i-nay be generated by generating discrete packets of operational parameters including atmospheric gas flow rate, oxygen content of atmospheric gas, thermal management, laser power, laser focus, laser travel speed, laser alignment, or any combination of these operational parameters of the network-connected additive manufacturing device.

The method 500 may involve encrypting and sending operational parameters to enable a network-connected additive manufacturing device to manufacture the product, as indicated at act 512. For example, the operational parameters may be sent for manufacturing as discrete packets, with at least one packet being sent after receipt of confirmation that at least another previous packet is complete and associated operational parameters for the at least another previous packet have been deleted, as also indicated at act 512. When sending subsequent packets, a time from completion of the respective previous packet may be sufficient to ensure that another respective portion of the product to be manufactured responsive to execution of the subsequent packet may begin without interruption in an additive manufacturing process. More specifically, an initial set of packets of operational parameters sent to the additive manufacturing device may include sufficient operational parameters that operational parameters in a first packet can be completed, manufacturing can continue uninterrupted, confirmation of completion and deletion of the first packet can be received, and subsequent packets may be sent and received, again without interrupting manufacturing and without the manufacturing device having access to sufficient operational parameters to manufacture the entire product at a time.

Transmission of the operational parameters may be achieved by, for example, a server hosting a system for providing end-to-end verification sending encrypted packets of the operational parameters to a client device (e.g., a network-connected additive manufacturing device, a network-connected CNC manufacturing device). The client device may have a private key enabling the client device to decrypt and utilize the operational parameters to manufacture the product (e.g., as a result of a prequalification process). The packets may also include instructions causing the client device to delete the operational parameters and other data in a given packet following execution. The packets may further include access restrictions configured to report unauthorized access of the operational parameters by devices other than the authorized client device or access and use by the client device beyond expected access and use. By separating the manufacturing instructions into discrete packets, tracking access and use, and optionally pre-qualifying participants in the system, risks of copying, reverse-engineering, and the manufacture of unauthorized products may be reduced. The method 500 may then involve updating the blockchain to associate the operational parameters with the encrypted, secure identifier utilizing the secure, distributed transaction ledger, as indicated at act 514.

In some examples, the method 500 may involve updating the blockchain to associate a specification for additively manufacturing the product with the encrypted, secure identifier utilizing the secure, distributed transaction ledger before encrypting and sending the respective packets of operational parameters to the network-connected additive manufacturing device. For example, a product file in a digital inventory may include manufacturing instructions for manufacturing the product utilizing a variety of manufacturing techniques, including additive manufacturing. In such an example, the system may access the product file, decrypt at least the specification for additively manufacturing the product, and re-encrypt and store only the specification for additively manufacturing the product in the blockchain.

In some examples, the method 500 may involve accepting in-manufacture verification of a product characteristic for a portion of the product manufactured by the additive manufacturing device. For example, data generated by one or more network-connected detectors oriented and positioned to detect one or more characteristics of the product during manufacturing may be received. More specifically, the in-manufacture verification of the product characteristic for the portion of the product manufactured by the network-connected additive manufacturing device may be accepted from, for example, an image sensor, a heat sensor, a sound sensor, or any combination of these positioned and oriented to automatically detect the product characteristic. Upon or after receipt, the blockchain may be updated to associate the in-manufacture verification of the product characteristic with the encrypted, secure identifier utilizing the secure, distributed transaction ledger.

In some examples, the system may be configured to accept an indication whether the blockchain is to contain all data collected in support of the in-manufacture verification of the product characteristic or an indication that the product characteristic meets or does not meet a threshold for the product characteristic. For example, an order may specify whether a customer requires or prefers verification of all data or an indication that the product is within or outside specification. When verification of all data is indicated, the system may be configured to receive all the data in support of the in-manufacture verification of the product characteristic. When the indication is requested, the system may receive all the data, compare the data to the specification, optionally request confirmation from an authorizing party (e.g., a neutral third-party inspector, the customer) that the product characteristic is within specification, and generate an indication whether the product characteristic is or is not within specification. The system may then update the blockchain to associate the all the data in support of the in-manufacture verification of the product characteristic or the indication that the product characteristic meets or does not meet the threshold for the product characteristic with the encrypted, secure identifier utilizing the secure, distributed transaction ledger. Such an update may correspond with, and be tailored in response to the indication whether the blockchain is to contain all the data collected in support of the in-manufacture verification of the product characteristic or the indication that the product characteristic meets or does not meet the threshold.

In some examples, the method 500 may involve accepting post-manufacture verification of operational parameters for post-manufacture processing performed on the product, post-manufacture product characteristics for the product, or both. In some such examples, acceptance of the in-manufacture verification of the operational parameters utilized by the additive manufacturing device when manufacturing the product may be accomplished by accepting an indication that all the operational parameters utilized by the additive manufacturing device when manufacturing the product were within a specified threshold, More specifically, acceptance of the in-manufacture verification of the operational parameters utilized by the additive manufacturing device when manufacturing the product may involve, for example, receiving a log of at least substantially all the operational parameters utilized by the additive manufacturing device when manufacturing the product. As a specific, nonlimiting example, the system may accept the in-manufacture verification of the operational parameters utilized by the additive manufacturing device when manufacturing the product by receiving the log in real time from a network-connected additive manufacturing device while the network-connected additive manufacturing device manufactures the product. As another example, acceptance of the in-manufacture verification of the post-manufacture product characteristics for the product may involve accepting post-manufacture RT metrology, tensile strength, Rockwell hardness, microstructure, density, porosity, impact toughness, or any combination of these characteristics of the product. More specifically, acceptance of the in-manufacture verification of the post-manufacture product characteristics for the product may involve, for example, receiving scan data from a computed tomography scanner positioned and oriented to automatically detect the post-manufacture product characteristics. Upon receipt of the post-manufacture verification of operational parameters for post-manufacture processing performed on the product, post-manufacture product characteristics for the product, or both, the system may update the blockchain to associate the post-manufacture verification of the operational parameters for the post-manufacture processing performed on the product, the post-manufacture product characteristics for the product, or both, with the encrypted, secure identifier utilizing the secure, distributed transaction ledger.

In some examples, the method 500 may involve generating another discrete packet of operational parameters to enable the additive manufacturing device to manufacture a witness mass representative of a material composition of at least a portion of the product. The system may encrypt and send the other discrete packet of operational parameters to the network-connected additive manufacturing device. The system may then update the blockchain to associate the other discrete packet of operational parameters with the encrypted, secure identifier utilizing the secure, distributed transaction ledger. In some examples, production of the witness mass may take place before manufacturing of the product. In some such examples, the system may require approval from an entity (e.g., an indifferent third-party inspector, the customer) of the witness mass before proceeding toward manufacturing the product.

Figure 6:
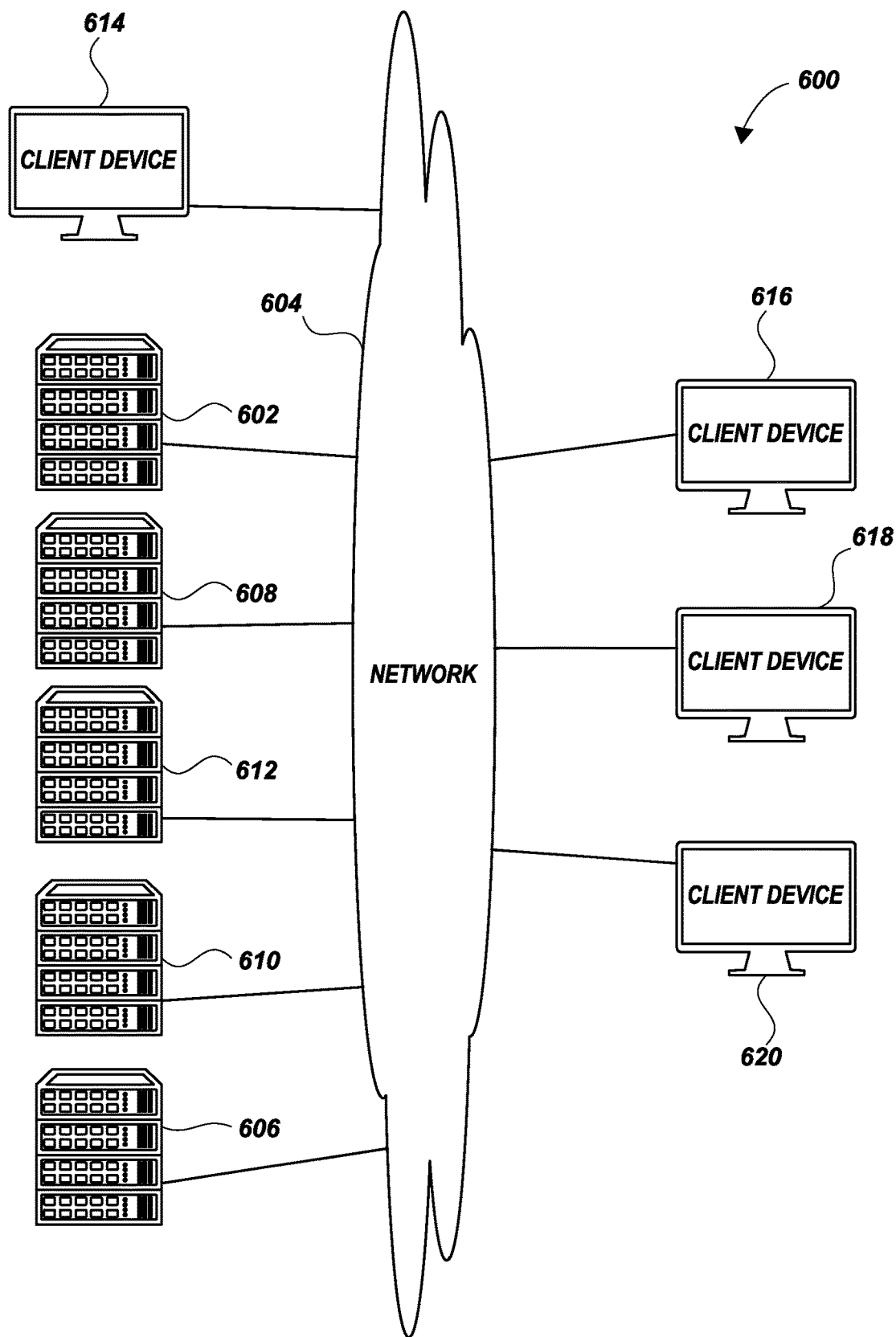
FIG. 6 is a schematic of a network for implementing end-to-end verification of workflow processes.

FIG. 6 is a schematic of a network 600 for implementing end-to-end verification of workflow processes. The network 600 may include, for example, at least one first server 602 configured to host at least some modules for administering a system for verifying end-to-end workflows of a product. For example, the first server 602 or first grouping of servers 602 may host software including an ordering module, an API for interfacing with a physical inventory module, a digital inventory module, a design selection assistance module, a manufacturing module, an API for interfacing with an order fulfillment module, an API for receiving input from a use and wear input module, and an API for receiving input from a repair and refurbishment module, as described previously in connection with FIG. 1. The first server 602 or first grouping of servers 602 may be connected to a network 604 to enable communication for administration of the system. For example, the first server 602 or first grouping of servers 602 may be connected to a local area network (LAN), a wide area network (WAN), or the Internet.

In some examples, the network 600 may include additional servers or additional groupings of servers dedicated to store data usable by the system or to administer certain modules of the system. For example, the network 600 may include a second server 606 or a second grouping of servers 606 configured to administer and store or host a node of the blockchain for containing the verification of the end-to-end workflows for the product.

The second server 606 or second grouping of servers 606 may be publicly accessible in some examples, though the data stored in the second server 606 or second grouping of servers 606 may be encrypted, requiring a user to have one or more private keys to decrypt the data. For example, some users may have private keys enabling decryption of only those portions of the blockchain (e.g., blocks, portions of blocks) for which the user has prequalified access. More specifically, the blockchain may be encrypted utilizing multiple encryption (also called "cascade encryption," "cascade ciphering," and "superencipherment"), with all users hosting nodes of the blockchain having private keys to decrypt a first layer of encryption, granting access to any single-encrypted data, and only certain users having private keys to fully decrypt all layers of encryption of a given set or subset of data. As a specific, nonlimiting example, approval from respective administrators may be required to enable an entity to fully decrypt all layers of encryption. In such an example, approval from each designer or other rights holder in a product design may be required to decrypt data representative of the product design and instructions for manufacturing the product design; approval from the manufacturer of a product may be required to decrypt data representative of the manufacturing processes (e.g., actual operational parameters) used during manufacturing; approval from the post-processor of a product may be required to decrypt data representative of the post-processing (e.g., actual operational parameters) performed on the product. In some such examples, a customer, purchaser, or other owner of a product may be pre-approved to fully decrypt all data verifying the workflows for the product.

In some examples, the second server 606 or second grouping of servers 606 may be distinct from the first server 602 or first grouping of servers 602. In other examples, the second server 606 or second grouping of servers 606 may be integrated with or the same as the first server 602 or first grouping of servers 602.

In some examples, the network 600 may include a third server 608 or a third grouping of servers 608 configured to administer an API to access, or to administer and store or host a node of another blockchain for containing, the digital inventory. The third server 608 or third grouping of servers 608 may not be publicly accessible, and the data stored in the third server 608 or third grouping of servers 608 may be encrypted, requiring a user to have one or more private keys to decrypt the data, as discussed previously in connection with the second server 606 or second grouping of servers 606. In some examples, the third server 608 or third grouping of servers 608 may be distinct from the first server 602 or first grouping of servers 602 and/or the second server 606 or second grouping of servers 606. In other examples, the third server 608 or third grouping of servers 608 may be integrated with or the same as the first server 602 or first grouping of servers 602, the second server 606 or second grouping of servers 606, or both.

In some examples, the network 600 may include a fourth server 610 or a fourth grouping of servers 610 configured to administer an API to access, or to administer and store or host a node of yet another blockchain for containing, data representative of physical inventory (e.g., of customers, precursor suppliers, manufacturers, post-processors). The fourth server 610 or fourth grouping of servers 610 may not be publicly accessible, and the data stored in the fourth server 610 or fourth grouping of servers 610 may be encrypted, requiring a user to have one or more private keys to decrypt the data, as discussed previously in connection with the second server 606 or second grouping of servers 606. In some examples, the fourth server 610 or fourth grouping of servers 610 may be distinct from the first server 602 or first grouping of servers 602, the second server 606 or second grouping of servers 606, and/or the third server 608 or third grouping of servers 608. In other examples, the fourth server 610 or fourth grouping of servers 610 may be integrated with or the same as the first server 602 or first grouping of servers 602, the second server 606 or second grouping of servers 606, the third server 608 or third grouping or servers 608, or any combination or subcombination of these.

In some examples, the network 600 may include a fifth server 612 or a fifth grouping of servers 612 configured to administer an API to access, or to administer and store or host a node of still another blockchain for containing, a database of keys required to encrypt and decrypt the data handled by the system. The fifth server 612 or fifth grouping of servers 612 may only be accessible to the system, and other users of the system may be required to maintain a separate database of their own keys for interacting with the system in some embodiments. In other embodiments, the fifth server 612 or fifth grouping of servers 612 may only be accessible to pre-authenticated users of the system with access restrictions enabling a user to only access those keys which the pre-authenticated user is authorized to utilize. In some examples, the fifth server 612 or fifth grouping of servers 612 may be distinct from the first server 602 or first grouping of servers 602, the second server 606 or second grouping of servers 606, the third server 608 or third grouping of servers 608, and/or the fourth server 610 or the fourth grouping of servers 610. In other examples, the fifth server 612 or fifth grouping of servers 612 may be integrated with or the same as the first server 602 or first grouping of servers 602, the second server 606 or second grouping of servers 606, the third server 608 or third grouping or servers 608, the fourth server 610 or fourth grouping of servers 610, or any combination or subcombination of these.

The network 600 may be accessible to one or more client devices. For example, a client device 614 of a customer, a client device 616 of a designer or other rights holder in a product design, a client device 618 of a manufacturer, and/or a client device 620 of another entity authorized to participate in the system (e.g., a precursor provider, a post-processor, a delivery service provider, an auditor, a regulator, a system administrator) may access the system via the network 604. More specifically, the first server 602 or first grouping of servers 602 may deliver data to the respective client device 614 through 620 from the respective other servers 606 through 612 or other groupings of servers 606 through 612, the data being unencrypted and in at least some instances re-encrypted by the system on the first server 602 or first groupings of servers 602 before sending to the respective client device 614 through 620. The servers and client devices may be configured as network-connectable computer systems, as described in greater detail in connection with FIG. 7, or other network-connectable devices (e.g., network-connected manufacturing devices).

Figure 7:
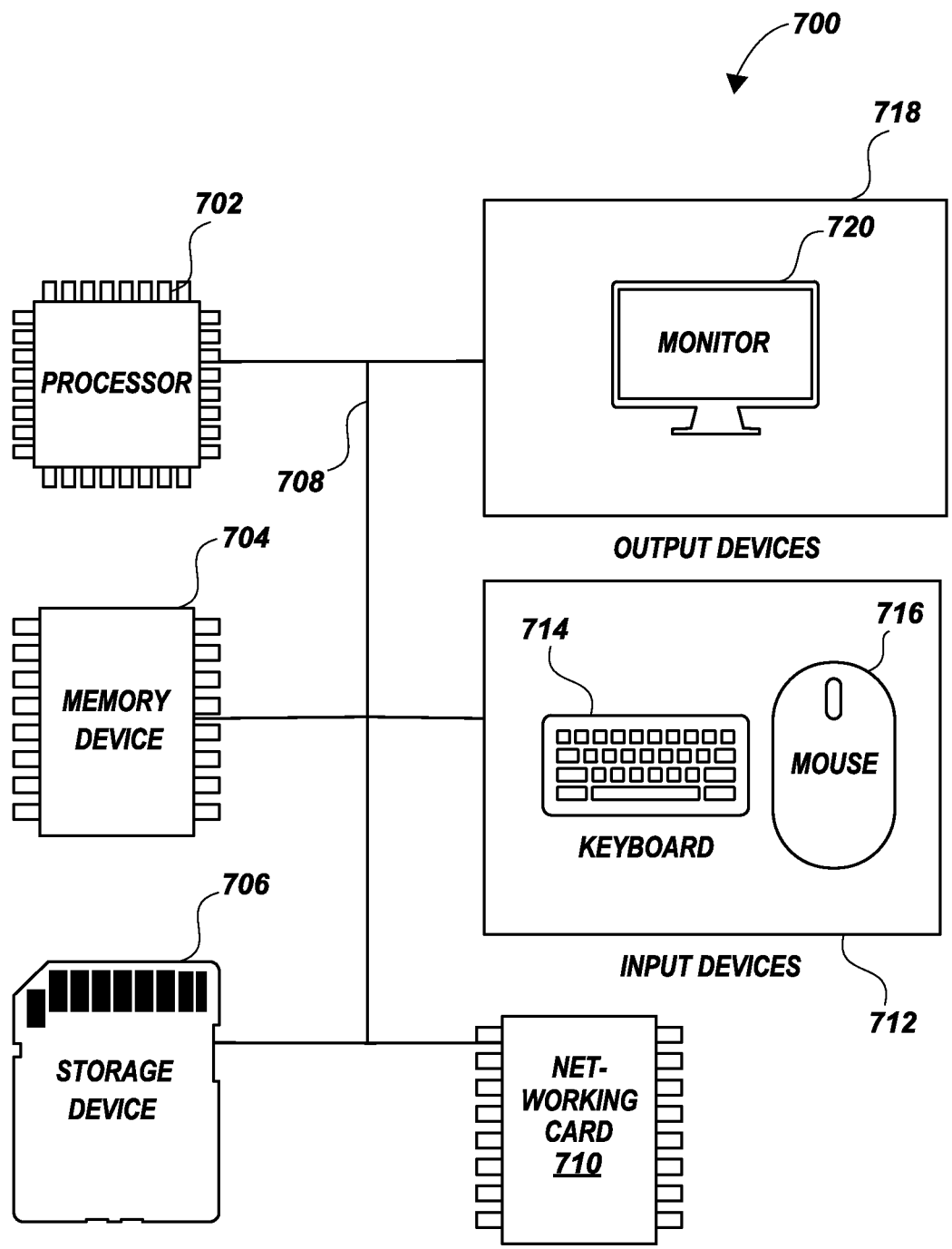
FIG. 7 is a schematic of a computer system for connection to the network of FIG. 6.

FIG. 7 is a schematic of a computer system 700 for connection to the network of FIG. 6. The computer system 700 may include, for example, at least one processor 702 configured to execute software programs containing computing instructions. The processor 702 may be configured to execute a wide variety of operating systems and applications including the computing instructions for administering systems and subsystems in accordance with this disclosure. The processor 702 may be configured as, for example, a microprocessor, controller, microcontroller, or state machine suitable for carrying out processes of the present disclosure. The processor 702 may also be implemented as a combination of computing devices, such as a combination of a DSP and a microprocessor, a plurality of microprocessors, one or more microprocessors in conjunction with a DSP core, or any other such configuration.

The computer system 700 may also include at least one memory device 704 configured to hold computing instructions, data, and other information for performing a wide variety of tasks including administering systems and subsystems of the present disclosure. By way of example, and not limitation, the memory device 704 may include Synchronous Random Access Memory (SRAM), Dynamic RAM (DRAM), Read-Only Memory (ROM), Flash memory, and the like.

The computer system 700 may further include at least one storage device 706 configured to store relatively large amounts of nonvolatile information for use in the computer system 700. By way of example and not limitation, the storage device 706 may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices. "Computer readable media," as utilized herein, excludes transitory signals.

The processor 702, memory device 704, and storage device 706 may be interconnected to one another utilizing a bus 708. A person of ordinary skill in the art will recognize that the computer system 700 may be configured in many different ways with different types of interconnecting buses between the various elements. Moreover, the various elements may be subdivided physically, functionally, or a combination thereof. As one nonlimiting example, the memory device 704 may be divided into cache memory, graphics memory, and main memory. Each of these memories may communicate directly or indirectly with the processor 702 on separate buses, partially combined buses, or a common bus.

A networking card 710 may be connected to the remainder of the computer system 700 via the bus 708. The networking card 710 may be configured for communicating with other devices or communication networks. As nonlimiting examples, the networking card 710 may include elements for communicating on wired and wireless communication media, such as for example, serial ports, parallel ports, Ethernet connections, universal serial bus (USB) connections, IEEE 1394 ("firewire") connections, Thunderbolt™ connections, Bluetooth® wireless networks, ZigBee wireless networks, 802 (deleted). 11 type wireless networks, cellular telephone/data networks, and other suitable communication interfaces and protocols.

In some examples, such as when the computer system 700 is configured as a client device, the computer system 700 may include one or more input devices 712 configured to receive user input. As specific, nonlimiting examples, the input devices 712 may include a keyboard 714 and mouse 716, though other input devices 712 may include image sensors, microphones, trackballs, macropads, and other input devices 712 known in the art.

In some examples, such as when the computer system 700 is configured as a client device, the computer system 700 may include one or more output devices 718 configured to provide output. As specific, nonlimiting examples, the output devices 718 may include a monitor 720; though other output devices 718 may include audio drivers and other output devices 718 known in the art.

Systems in accordance with this disclosure may enable secure, decentralized manufacturing of products. Workflows executed when performing the secure, decentralized manufacturing may be captured and reflected in a secure database for verifying the workflows. For example, building the system on a blockchain backbone may ensure that the provenance of products is verifiable, reducing the risk of black and grey market products circulating from the system. In addition, implementing the system with blockchain technology and encryption protocols, including multi-layered encryption in at least some instances, may reduce the risk that unauthorized products will be manufactured in the first place.

Repeatable, verified manufacturing of products may also realize downstream benefits. For example, a customer wishing to audit a manufacturer's capabilities, equipment, calibration, and performance may turn to the verified record of workflows, rather than sending an auditor to inspect the manufacturer's facilities. In addition, a regulator wishing to verify whether a product is compliant with relevant government standards may consult the verified record of workflows to receive a verified record of the product's sourcing, manufacturing, and characteristics.

Additional, nonlimiting examples within the scope of this disclosure may include the following:

Embodiment 1: A system, comprising: a memory device storing instructions that, when executed by a processor, cause the processor to: send identification of a product to be additively manufactured to a plurality of additive manufacturers; receive confirmation from at least one of the plurality of additive manufacturers of availability to additively manufacture the product; confirm approval of a respective additive manufacturer to additively manufacture the product design; update a blockchain to associate the approval of the respective additive manufacturer with an encrypted, secure identifier for the product to be additively manufactured utilizing a secure, distributed transaction ledger; generate discrete packets of operational parameters to enable an additive manufacturing device to manufacture the product, each packet comprising operational parameters to enable the additive manufacturing device to manufacture a respective portion of the product;

encrypt and send respective packets of operational parameters to a network-connected additive manufacturing device, the respective packets being sent only after receipt of confirmation that at least another previous packet is complete and associated operational parameters for the at least another previous packet have been deleted, a time from completion of the at least another previous packet being sufficient to ensure that another respective portion of the product to be manufactured responsive to execution of a subsequent packet may begin without interruption in an additive manufacturing process; update the blockchain to associate the encrypted packets of operational parameters with the encrypted, secure identifier utilizing the secure, distributed transaction ledger.

Embodiment 2: The system of Embodiment 1, wherein the memory device stores instructions that, when executed by the processor, cause the processor to: accept from the respective additive manufacturer another encrypted, secure identifier when receiving the confirmation from the at least one of the plurality of additive manufacturers of availability to additively manufacture the product, the other encrypted, secure identifier indicative of a preexisting verification of capability and approval of the respective additive manufacturer to additively manufacture the product to be additively manufactured.

Embodiment 3: The system of Embodiment 2, wherein the memory device stores instructions that, when executed by the processor, cause the processor to: accept from the respective additive manufacturer the other encrypted, secure identifier, the other encrypted, secure identifier indicative of a preexisting verification of capabilities comprising additive manufacturing device model, additive manufacturing device calibration, certification of additive manufacturing device operator, intellectual property ownership of a product design for the product to be additively manufactured, intellectual property license to additively manufacture the product to be additively manufactured, or a combination of these capabilities.

Embodiment 4: The system of any one of Embodiments 1 through 3, wherein the memory device stores instructions that, when executed by the processor, cause the processor to: accept from the respective additive manufacturer a verification of capability and approval of the respective additive manufacturer to additively manufacture the product to be additively manufactured when receiving the confirmation from the at least one of the plurality of additive manufacturers of availability to additively manufacture the product.

Embodiment 5: The system of any one of Embodiments 1 through 4, wherein the memory device stores instructions that, when executed by the processor, cause the processor to: accept in-manufacture verification of a product characteristic for a portion of the product manufactured by the additive manufacturing device automatically from at least one network-connected detector; and update the blockchain to associate the in-manufacture verification of the product characteristic with the encrypted, secure identifier utilizing the secure, distributed transaction ledger.

Embodiment 6: The system of Embodiment 5, wherein the memory device stores instructions that, when executed by the processor, cause the processor to: accept in-manufacture verification of the product characteristic for the portion of the product manufactured by the additive manufacturing device automatically from at least one network-connected image sensor, heat sensor, sound sensor, or any combination of these positioned and oriented to automatically detect the product characteristic.

Embodiment 7: The system of Embodiment 5 or Embodiment 6, wherein the memory device stores instructions that, when executed by the processor, cause the processor to: accept an indication whether the blockchain is to contain all data collected in support of the in-manufacture verification of the product characteristic or an indication that the product characteristic meets or does not meet a threshold for the product characteristic: receive all the data in support of the in-manufacture verification of the product characteristic; and update the blockchain to associate the all the data in support of the in-manufacture verification of the product characteristic or the indication that the product characteristic meets or does not meet the threshold for the product characteristic with the encrypted, secure identifier utilizing the secure, distributed transaction ledger to correspond with the indication whether the blockchain is to contain all the data collected in support of the in-manufacture verification of the product characteristic or the indication that the product characteristic meets or does not meet the threshold.

Embodiment 8: The system of any one of Embodiments 1 through 7, wherein the memory device stores instructions that, when executed by the processor, cause the processor to: accept pre-manufacture verification of capabilities of the respective additive manufacturer by receiving images of quality required documentation.

Embodiment 9: The system of any one of Embodiments 1 through 8, wherein the memory device stores instructions that, when executed by the processor, cause the processor to: accept post-manufacture verification of operational parameters for post-manufacture processing performed on the product, post-manufacture product characteristics for the product, or both; and update the blockchain to associate the post-manufacture verification of the operational parameters for the post-manufacture processing performed on the product, the post-manufacture product characteristics for the product, or both, with the encrypted, secure identifier utilizing the secure, distributed transaction ledger.

Embodiment 10: The system of any one of Embodiments 1 through 9, wherein the memory device stores instructions that, when executed by the processor, cause the processor to: update the blockchain to associate a specification for additively manufacturing the product with the encrypted, secure identifier utilizing the secure, distributed transaction ledger before encrypting and sending the respective packets of operational parameters to the network-connected additive manufacturing device.

Embodiment 11: The system of any one of Embodiments 1 through 10, wherein the memory device stores instructions that, when executed by the processor, cause the processor to: generate another discrete packet of operational parameters to enable the additive manufacturing device to manufacture a witness mass representative of a material composition of at least a portion of the product; encrypt and send the other discrete packet of operational parameters to the network-connected additive manufacturing device; and update the blockchain to associate the other discrete packet of operational parameters with the encrypted, secure identifier utilizing the secure, distributed transaction ledger.

Embodiment 12: A method, comprising: sending identification of a product to be additively manufactured to a plurality of additive manufacturers; receiving confirmation from at least one of the plurality of additive manufacturers of availability to additively manufacture the product; confirming approval of a respective additive manufacturer to additively manufacture the product design; updating a blockchain to associate the approval of the respective additive manufacturer with an encrypted, secure identifier for the product to be additively manufactured utilizing a secure, distributed transaction ledger; generating discrete packets of operational parameters to enable an additive manufacturing device to manufacture the product, each packet comprising operational parameters to enable the additive manufacturing device to manufacture a respective portion of the product; encrypting and sending respective packets of operational parameters to a network-connected additive manufacturing device, the respective packets being sent only after receipt of confirmation that at least another previous packet is complete and associated operational parameters for the at least another previous packet have been deleted, a time from completion of the at least another previous packet being sufficient to ensure that another respective portion of the product to be manufactured responsive to execution of a subsequent packet may begin without interruption in an additive manufacturing process; updating the blockchain to associate the encrypted packets of operational parameters with the encrypted, secure identifier utilizing the secure, distributed transaction ledger.

Embodiment 13: The method of Embodiment 12, comprising accepting from the respective additive manufacturer another encrypted, secure identifier when receiving the confirmation from the at least one of the plurality of additive manufacturers of availability to additively manufacture the product, the other encrypted, secure identifier indicative of a preexisting verification of capability and approval of the respective additive manufacturer to additively manufacture the product to be additively manufactured.

Embodiment 14: The method of Embodiment 13, comprising accepting from the respective additive manufacturer the other encrypted, secure identifier, the other encrypted, secure identifier indicative of a preexisting verification of capabilities comprising additive manufacturing device model, additive manufacturing device calibration, certification of additive manufacturing device operator, intellectual property ownership of a product design for the product to be additively manufactured, intellectual property license to additively manufacture the product to be additively manufactured, or a combination of these capabilities.

Embodiment 15: The method of any one of Embodiments 12 through 14, comprising accepting from the respective additive manufacturer a verification of capability and approval of the respective additive manufacturer to additively manufacture the product to be additively manufactured when receiving the confirmation from the at least one of the plurality of additive manufacturers of availability to additively manufacture the product.

Embodiment 16: The method of any one of Embodiments 12 through 15, comprising: accepting in-manufacture verification of a product characteristic for a portion of the product manufactured by the additive manufacturing device automatically from at least one network-connected detector; and updating the blockchain to associate the in-manufacture verification of the product characteristic with the encrypted, secure identifier utilizing the secure, distributed transaction ledger.

Embodiment 17: The method of Embodiment 16, comprising accepting in-manufacture verification of the product characteristic for the portion of the product manufactured by the additive manufacturing device automatically from at least one network-connected image sensor, heat sensor, sound sensor, or any combination of these positioned and oriented to automatically detect the product characteristic.

Embodiment 18: The method of Embodiment 16 or Embodiment 17, comprising: accepting an indication whether the blockchain is to contain all data collected in support of the in-manufacture verification of the product characteristic or an indication that the product characteristic meets or does not meet a threshold for the product characteristic; receiving all the data in support of the in-manufacture verification of the product characteristic; and updating the blockchain to associate the all the data in support of the in-manufacture verification of the product characteristic or the indication that the product characteristic meets or does not meet the threshold for the product characteristic with the encrypted, secure identifier utilizing the secure, distributed transaction ledger to correspond with the indication whether the blockchain is to contain all the data collected in support of the in-manufacture verification of the product characteristic or the indication that the product characteristic meets or does not meet the threshold.

Embodiment 19: The method of any one of Embodiments 12 through 18, comprising: accepting post-manufacture verification of operational parameters for post-manufacture processing performed on the product, post-manufacture product characteristics for the product, or both; and updating the blockchain to associate the post-manufacture verification of the operational parameters for the post-manufacture processing performed on the product, the post-manufacture product characteristics for the product, or both, with the encrypted, secure identifier utilizing the secure, distributed transaction ledger.

Embodiment 20: The method of any one of Embodiments 12 through 19, comprising: generating another discrete packet of operational parameters to enable the additive manufacturing device to manufacture a witness mass representative of a material composition at least a portion of the product; encrypting and sending the other discrete packet of operational parameters to the network-connected additive manufacturing device; and updating the blockchain to associate the other discrete packet of operational parameters with the encrypted, secure identifier utilizing the secure, distributed transaction ledger.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure.

What is claimed is:

1. A system, comprising:
a memory device storing instructions that, when executed by a processor, cause the processor to:
send identification of a product to be additively manufactured to at least one additive manufacturer;
receive confirmation from the at least one additive manufacturer of availability to additively manufacture the product;
confirm approval of a respective additive manufacturer to additively manufacture a product design for the product;
update a blockchain to associate the approval of the respective additive manufacturer with an encrypted, secure identifier for the product to be additively manufactured utilizing a secure, distributed transaction ledger;
generate discrete packets of operational parameters to enable an additive manufacturing device to manufacture the product, each packet comprising operational parameters to enable the additive manufacturing device to manufacture a respective portion of the product;
encrypt and send respective packets of operational parameters to a network-connected additive manufacturing device, the respective packets being sent only after receipt of confirmation that at least another previous packet is complete and associated operational parameters for the at least another previous packet have been deleted, a time from completion of the at least another previous packet being sufficient to ensure that another respective portion of the product to be manufactured responsive to execution of a subsequent packet may begin without interruption in an additive manufacturing process; and
update the blockchain to associate the encrypted packets of operational parameters with the encrypted, secure identifier utilizing the secure, distributed transaction ledger.

2. The system of claim 1, wherein the memory device stores instructions that, when executed by the processor, cause the processor to:
accept from the respective additive manufacturer another encrypted, secure identifier when receiving the confirmation from the at least one additive manufacturer of availability to additively manufacture the product, the other encrypted, secure identifier indicative of a pre-existing verification of capability and approval of the respective additive manufacturer to additively manufacture the product to be additively manufactured.

3. The system of claim 2, wherein the memory device stores instructions that, when executed by the processor, cause the processor to:
accept from the respective additive manufacturer the other encrypted, secure identifier, the other encrypted, secure identifier indicative of a preexisting verification of capabilities comprising additive manufacturing device model, additive manufacturing device calibration, certification of additive manufacturing device operator, intellectual property ownership of a product design for the product to be additively manufactured, intellectual property license to additively manufacture the product to be additively manufactured, or a combination of these capabilities.

4. The system of claim 1, wherein the memory device stores instructions that, when executed by the processor, cause the processor to:
accept from the respective additive manufacturer a verification of capability and approval of the respective additive manufacturer to additively manufacture the product to be additively manufactured when receiving the confirmation from the at least one additive manufacturer of availability to additively manufacture the product.

5. The system of claim 1, wherein the memory device stores instructions that, when executed by the processor, cause the processor to:
accept in-manufacture verification of a product characteristic for a portion of the product manufactured by the additive manufacturing device automatically from at least one network-connected detector; and
update the blockchain to associate the in-manufacture verification of the product characteristic with the encrypted, secure identifier utilizing the secure, distributed transaction ledger.

6. The system of claim 5, wherein the memory device stores instructions that, when executed by the processor, cause the processor to:
accept in-manufacture verification of the product characteristic for the portion of the product manufactured by the additive manufacturing device automatically from at least one network-connected image sensor, heat sensor, sound sensor, or any combination of these positioned and oriented to automatically detect the product characteristic.

7. The system of claim 5, wherein the memory device stores instructions that, when executed by the processor, cause the processor to:
accept an indication whether the blockchain is to contain all data collected in support of the in-manufacture verification of the product characteristic or an indication that the product characteristic meets or does not meet a threshold for the product characteristic;
receive all the data in support of the in-manufacture verification of the product characteristic; and
update the blockchain to associate all the data in support of the in-manufacture verification of the product characteristic or the indication that the product characteristic meets or does not meet the threshold for the product characteristic with the encrypted, secure identifier utilizing the secure, distributed transaction ledger to correspond with the indication whether the blockchain is to contain all the data collected in support of the in-manufacture verification of the product characteristic or the indication that the product characteristic meets or does not meet the threshold.

8. The system of claim 1, wherein the memory device stores instructions that, when executed by the processor, cause the processor to:
accept pre-manufacture verification of capabilities of the respective additive manufacturer by receiving images of quality required documentation.

9. The system of claim 1, wherein the memory device stores instructions that, when executed by the processor, cause the processor to:
accept post-manufacture verification of operational parameters for post-manufacture processing performed on the product, post-manufacture product characteristics for the product, or both; and
update the blockchain to associate the post-manufacture verification of the operational parameters for the post-manufacture processing performed on the product, the post-manufacture product characteristics for the product, or both, with the encrypted, secure identifier utilizing the secure, distributed transaction ledger.

10. The system of claim 1, wherein the memory device stores instructions that, when executed by the processor, cause the processor to:
update the blockchain to associate a specification for additively manufacturing the product with the encrypted, secure identifier utilizing the secure, distributed transaction ledger before encrypting and sending the respective packets of operational parameters to the network-connected additive manufacturing device.

11. The system of claim 1, wherein the memory device stores instructions that, when executed by the processor, cause the processor to:
generate another discrete packet of operational parameters to enable the additive manufacturing device to manufacture a witness mass representative of a material composition of at least a portion of the product;
encrypt and send the other discrete packet of operational parameters to the network-connected additive manufacturing device; and
update the blockchain to associate the other discrete packet of operational parameters with the encrypted, secure identifier utilizing the secure, distributed transaction ledger.

12. A method, comprising:
sending identification of a product to be additively manufactured to at least one additive manufacturer;
receiving confirmation from the at least one additive manufacturer of availability to additively manufacture the product;
confirming approval of a respective additive manufacturer to additively manufacture a product design for the product;
updating a blockchain to associate the approval of the respective additive manufacturer with an encrypted, secure identifier for the product to be additively manufactured utilizing a secure, distributed transaction ledger;
generating discrete packets of operational parameters to enable an additive manufacturing device to manufacture the product, each packet comprising operational parameters to enable the additive manufacturing device to manufacture a respective portion of the product;
encrypting and sending respective packets of operational parameters to a network-connected additive manufacturing device, the respective packets being sent only after receipt of confirmation that at least another previous packet is complete and associated operational parameters for the at least another previous packet have been deleted, a time from completion of the at least another previous packet being sufficient to ensure that another respective portion of the product to be manufactured responsive to execution of a subsequent packet may begin without interruption in an additive manufacturing process; and
updating the blockchain to associate the encrypted packets of operational parameters with the encrypted, secure identifier utilizing the secure, distributed transaction ledger.

13. The method of claim 12, comprising accepting from the respective additive manufacturer another encrypted, secure identifier when receiving the confirmation from the at least one additive manufacturer of availability to additively manufacture the product, the other encrypted, secure identifier indicative of a preexisting verification of capability and approval of the respective additive manufacturer to additively manufacture the product to be additively manufactured.

14. The method of claim 13, comprising accepting from the respective additive manufacturer the other encrypted, secure identifier, the other encrypted, secure identifier indicative of a preexisting verification of capabilities comprising additive manufacturing device model, additive manufacturing device calibration, certification of additive manufacturing device operator, intellectual property ownership of a product design for the product to be additively manufactured, intellectual property license to additively manufacture the product to be additively manufactured, or a combination of these capabilities.

15. The method of claim 12, comprising accepting from the respective additive manufacturer a verification of capability and approval of the respective additive manufacturer to additively manufacture the product to be additively manufactured when receiving the confirmation from the at least one additive manufacturer of availability to additively manufacture the product.

16. The method of claim 12, comprising:
accepting in-manufacture verification of a product characteristic for a portion of the product manufactured by the additive manufacturing device automatically from at least one network-connected detector; and
updating the blockchain to associate the in-manufacture verification of the product characteristic with the encrypted, secure identifier utilizing the secure, distributed transaction ledger.

17. The method of claim 16, comprising accepting in-manufacture verification of the product characteristic for the portion of the product manufactured by the additive manufacturing device automatically from at least one network-connected image sensor, heat sensor, sound sensor, or any combination of these positioned and oriented to automatically detect the product characteristic.

18. The method of claim 16, comprising:
accepting an indication whether the blockchain is to contain all data collected in support of the in-manufacture verification of the product characteristic or an indication that the product characteristic meets or does not meet a threshold for the product characteristic;
receiving all the data in support of the in-manufacture verification of the product characteristic; and
updating the blockchain to associate all the data in support of the in-manufacture verification of the product characteristic or the indication that the product characteristic meets or does not meet the threshold for the product characteristic with the encrypted, secure identifier utilizing the secure, distributed transaction ledger to correspond with the indication whether the blockchain is to contain all the data collected in support of the in-manufacture verification of the product characteristic or the indication that the product characteristic meets or does not meet the threshold.

19. The method of claim 12, comprising:
accepting post-manufacture verification of operational parameters for post-manufacture processing performed on the product, post-manufacture product characteristics for the product, or both; and
updating the blockchain to associate the post-manufacture verification of the operational parameters for the post-manufacture processing performed on the product, the post-manufacture product characteristics for the product, or both, with the encrypted, secure identifier utilizing the secure, distributed transaction ledger.

20. The method of claim 12, comprising:

generating another discrete packet of operational parameters to enable the additive manufacturing device to manufacture a witness mass representative of a material composition at least a portion of the product;

encrypting and sending the other discrete packet of operational parameters to the network-connected additive manufacturing device; and updating the blockchain to associate the other discrete packet of operational parameters with the encrypted, secure identifier utilizing the secure, distributed transaction ledger.

* * * * *

UNITED STATES PATENT AND TRADEMARK OFFICE
CERTIFICATE OF CORRECTION

PATENT NO. : 12,311,606 B2
APPLICATION NO. : 17/454387
DATED : May 27, 2025
INVENTOR(S) : Juan Carlos Flores Perez, Mikhail Gladkikh and Muhammad Faisal Iqbal It is certified that error appears in the above-identified patent and that said Letters Patent is hereby corrected as shown below:

In the Specification

| | | |
|---|---|---|
| Column 1, | Lines 7-8, | change "THIS APPLICATION CLAIMS THE BENEFIT UNDER 35 U.S.C. § 119(e) OF U.S. PROVISIONAL Patent" to --This application claims the benefit under 35 U.S.C. § 119(e) of U.S. Provisional Patent-- |
| Column 1, | Line 18, | change "supply chain More" to --supply chain. More-- |
| Column 2, | Line 3, | change "blockchain inay be" to --blockchain may be-- |
| Column 3, | Line 40, | change "payment, delivery use," to --payment, delivery, use,-- |
| Column 14, | Line 34, | change "randomized variation send the" to --randomized variation, send the-- |
| Column 15, | Line 66, | change "and copying). reverse-engineered" to --and copying). |

To tie the product to the encrypted, secure identifier for the product, one or more physical characteristics of the product may be altered, or the inevitable, naturally occurring, random variations in characteristics of the product (e.g., within specification, within tolerance) may be detected, and the alteration or variation stored in the blockchain in connection with the encrypted, secure identifier to indicate that detection of the identified physical characteristics in the product is representative of the materials and manufacturing processes used when manufacturing the product. More specifically, the manufacturing module 112 may instruct a network-connected additive manufacturing device to control one or more operational parameters (e.g., material feed rate, material dispenser position and/or movement rate, position and/or intensity of applied heat) to produce a randomized variation in one or more product characteristics (e.g., density, surface roughness, distribution of different materials) in one or more portions of the product (e.g., in a layer thereof, on an exterior surface thereof). The randomized produced variation may also be a consequence of normal statistical Signed and Sealed this
Twenty-sixth Day of August, 2025

Coke Morgan Stewart
*Acting Director of the United States Patent and Trademark Office*

CERTIFICATE OF CORRECTION (continued)
U.S. Pat. No. 12,311,606 B2

| | | |
|---|---|---|
| | | errors and deviations from exact values within manufacturing tolerances. The verification module 102 may encrypt and store data representative of the randomized variation in the blockchain such that the data representative of the randomized variation is associated with the encrypted, secure identifier for the product. An entity wishing to audit the workflow for the product may inspect the product to detect the randomized variation, send the randomized variation to the verification module 102, and receive from the verification module 102 an indication of the encrypted, secure identifier associated with the randomized variation and the product. In some examples, the alteration to the product may match a corresponding alteration in a witness mass produced when preparing to make or when making the product.
  In some examples, the verification module 102 may receive verification of operational parameters of a manufacturing device while the product is being made. For example, a network-connected manufacturing device (e.g., an additive manufacturing device) may send a record of operational parameters utilized when manufacturing the product to the verification module 102 in real time. The verification module 102 may record all the operational parameters utilized by the manufacturing device, providing real-time updates to the secure, distributed transaction ledger and associating those updates with the encrypted, secure identifier for the product, in some examples. Any record of actual operational parameters utilized may be encrypted to reduce the risk that a product and any methods of making that product may be reverse-engineered-- |
| Column 18, | Line 59, | change "added indications. send a communication" to --added indications. |
| | | When post-processing is verified as being complete, and the record of post-processing and/or final product characteristics is not within specification, the verification module 102 may at least temporarily suspend any further progress toward fulfillment of the order. In some examples, the verification module 102 may send a request for the entity that placed the order to accept or reject the product, given the known deviations from the specification. When receiving acceptance of the product despite the deviations, the order fulfillment module 114 may proceed toward fulfillment of the order. When receiving rejection of the product because of the deviations, the ordering module 104 may cancel the order or the manufacturing module 112 may coordinate re-manufacturing of the item in accordance with the specification, potentially utilizing a different manufacturing device and/or a different manufacturer altogether. When coordinating re-manufacturing of the product utilizing the same manufacturer, the verification module 102 may provide an indication of the reasons the product was rejected (e.g., a list of product characteristics outside specification, a disclosure of |

CERTIFICATE OF CORRECTION (continued)
U.S. Pat. No. 12,311,606 B2 values for the product characteristics as compared to the specification) and optionally recommendations for additional process controls that may be utilized to increase the likelihood that subsequent manufacturing efforts will result in a product within specification.

In some examples, the verification module 102 may compare the deviations from the specification to sets of predefined thresholds to automatically determine whether to accept or reject the final product. For example, the ordering module 104 may accept one or more thresholds outside a specification for the product design of the product, within which the customer will accept deviations, and outside which the customer will not accept deviations. When the actual deviations are outside the specification and within the threshold(s), the verification module 102 may automatically record acceptance of the product in the blockchain, consistent with the order, and the system 100 may proceed toward fulfillment. When the actual deviations are outside the specification and outside one or more of the threshold(s), the verification module 102 may automatically record rejection of the product in the blockchain, consistent with the order, and the ordering module 104 may cancel the order or the manufacturing module 112 may coordinate re-manufacturing of the product.

When the product has been manufactured and acceptance of the product has been confirmed by the verification module 102, an order fulfillment module 114 may coordinate fulfillment of the order with the product. For example, the order fulfillment module 114 may send a communication--

| | | |
|---|---|---|
| Column 18, | Line 66, | change "an APT) and" to --an API) and-- |
| Column 19, | Lines 41-42, | change "an API, In some" to --an API. In some-- |
| Column 21, | Line 54, | change "other tights holder" to --other rights holder-- |
| Column 22, | Line 24, | change "combination or sub combination of" to --combination or subcombination of-- |
| Column 25, | Line 24, | change "the product, Each" to --the product. Each-- |
| Column 32, | Line 22, | change "parameters i-nay be generated" to --parameters may be generated-- |
| Column 34, | Line 14, | change "specified threshold, More specifically," to --specified threshold. More specifically,-- |
| Column 40, | Lines 13-14, | change "product characteristic: receive all" to --product characteristic; receive all-- |